US012679641B2

(12) United States Patent
Wolf et al.

(10) Patent No.: US 12,679,641 B2
(45) Date of Patent: Jul. 14, 2026

(54) REFUSE VEHICLE WITH ASSISTED LIFT ASSEMBLY

(71) Applicant: Oshkosh Corporation, Oshkosh, WI (US)

(72) Inventors: Ryan Wolf, Oshkosh, WI (US); Christopher Rukas, Oshkosh, WI (US); Chris Mills, Oshkosh, WI (US); Greg Steffens, Oshkosh, WI (US); Eric Hutchinson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 431 days.

(21) Appl. No.: 18/215,035

(22) Filed: Jun. 27, 2023

(65) Prior Publication Data

US 2023/0415984 A1 Dec. 28, 2023

Related U.S. Application Data

(60) Provisional application No. 63/356,205, filed on Jun. 28, 2022.

(51) Int. Cl.
*B65F 3/04* (2006.01)
*B65F 3/02* (2006.01)

(52) U.S. Cl.
CPC ...... *B65F 3/041* (2013.01); *B65F 2003/0269* (2013.01); *B65F 2003/0279* (2013.01)

(58) Field of Classification Search
CPC .......... B65F 2003/025; B65F 2003/026; B65F 2003/027; B65F 3/04; B65F 3/043; B65F 3/041
See application file for complete search history.

(56) References Cited

U.S. PATENT DOCUMENTS

| | | | | | |
|---|---|---|---|---|---|
| 3,709,388 | A * | 1/1973 | Neufeldt | B60P 1/22 | 414/525.2 |
| 3,747,785 | A * | 7/1973 | Dahlin | B65F 3/041 | 414/303 |
| 5,772,385 | A * | 6/1998 | Huntoon | B65F 3/043 | 414/420 |
| 5,890,865 | A * | 4/1999 | Smith | B65F 3/28 | 414/408 |
| 5,954,470 | A * | 9/1999 | Duell | B65F 3/28 | 414/812 |
| 6,584,884 | B1 * | 7/2003 | Duell | F15B 11/121 | 91/533 |
| 11,254,499 | B2 * | 2/2022 | Rocholl | B65F 3/048 | |
| 11,685,599 | B2 * | 6/2023 | Rocholl | B65F 3/041 | 414/217 |
| 11,964,818 | B2 * | 4/2024 | Rocholl | B65F 3/048 | |
| 2019/0185077 | A1 | 6/2019 | Smith et al. | | |
| 2019/0276102 | A1 | 9/2019 | Zuleger et al. | | |

(Continued)

*Primary Examiner* — Kaitlin S Joerger
(74) *Attorney, Agent, or Firm* — Foley & Lardner LLP

(57) ABSTRACT

A refuse vehicle includes a chassis, a series of tractive elements coupled to the chassis, a refuse compartment coupled to the chassis, a lift arm rotatably coupled to the chassis and configured to engage a refuse container, a lift arm actuator coupled to the chassis and configured to move the lift arm relative to the chassis to raise the refuse container and deposit refuse from the refuse container into the refuse compartment, and a lift assister coupled to the chassis and the lift arm and configured to bias the lift arm to oppose downward movement of the lift arm.

16 Claims, 24 Drawing Sheets

(56) References Cited

U.S. PATENT DOCUMENTS

| | | | |
|---|---|---|---|
| 2020/0290237 | A1 | 9/2020 | Steffens et al. |
| 2020/0291846 | A1 | 9/2020 | Steffens et al. |
| 2021/0088036 | A1 | 3/2021 | Schubart et al. |
| 2021/0171137 | A1 | 6/2021 | Zuleger et al. |
| 2021/0276643 | A1 | 9/2021 | Ellifson et al. |
| 2021/0292086 | A1 | 9/2021 | Mahan et al. |
| 2021/0380179 | A1 | 12/2021 | Smith et al. |
| 2022/0072736 | A1 | 3/2022 | Steffens et al. |
| 2022/0097527 | A1 | 3/2022 | Koga et al. |
| 2022/0097961 | A1 | 3/2022 | Koga et al. |
| 2022/0097964 | A1 | 3/2022 | Koga et al. |
| 2022/0118854 | A1 | 4/2022 | Davis et al. |
| 2022/0185582 | A1 | 6/2022 | Koga et al. |
| 2023/0046193 | A1 | 2/2023 | Schubart et al. |
| 2023/0070279 | A1 | 3/2023 | Wheeler et al. |
| 2023/0070769 | A1 | 3/2023 | Wheeler et al. |
| 2023/0074504 | A1 | 3/2023 | Ellifson et al. |
| 2023/0089417 | A1 | 3/2023 | Koga et al. |
| 2023/0150584 | A1 | 5/2023 | Zeamer et al. |
| 2023/0150763 | A1 | 5/2023 | Haberlein et al. |
| 2023/0191887 | A1 | 6/2023 | Rausch et al. |
| 2023/0192401 | A1 | 6/2023 | Zeamer et al. |
| 2023/0211705 | A1 | 7/2023 | Zeamer et al. |
| 2023/0278425 | A1 | 9/2023 | Miller et al. |
| 2023/0278475 | A1 | 9/2023 | Steffens et al. |
| 2023/0294915 | A1 | 9/2023 | Koga et al. |

* cited by examiner

| Step | Action | Zone | Loaded or Unloaded | With or Against Gravity |
|---|---|---|---|---|
| 1 | Dumping | 1 | Loaded | Against |
| 2 | Dumping | 2 | Loaded | With |
| 3 | Returning | 2 | Unloaded | Against |
| 4 | Returning | 1 | Unloaded | With |

REFUSE VEHICLE WITH ASSISTED LIFT ASSEMBLY

CROSS-REFERENCE TO RELATED PATENT APPLICATION

This application claims the benefit of and priority to U.S. Provisional Application No. 63/356,205, filed on Jun. 28, 2022, the entire disclosure of which is hereby incorporated by reference herein.

BACKGROUND

The present disclosure relates generally to vehicles. More specifically, the present disclosure relates to a refuse vehicle that utilizes lift arms to raise and empty a refuse container.

SUMMARY

One embodiment relates to a refuse vehicle including a chassis, a series of tractive elements coupled to the chassis, a refuse compartment coupled to the chassis, a lift arm rotatably coupled to the chassis and configured to engage a refuse container, a lift arm actuator coupled to the chassis and configured to move the lift arm relative to the chassis to raise the refuse container and deposit refuse from the refuse container into the refuse compartment, and a lift assister coupled to the chassis and the lift arm and configured to bias the lift arm to oppose downward movement of the lift arm.

Another embodiment relates to a front-loading refuse vehicle including a chassis, a series of tractive elements coupled to the chassis, a refuse compartment coupled to the chassis, a lift arm coupled to the chassis and configured to engage a refuse container, the lift arm being rotatable relative to the chassis about an axis of rotation that extends laterally, a lift arm actuator coupled to the chassis and configured to move the lift arm between a forward position in which the lift arm extends forward of the axis of rotation and a rearward position in which the lift arm extends rearward of the axis of rotation, and a spring coupled to the chassis and the lift arm. At least one of (a) the spring is configured to bias the lift arm toward the rearward position when the lift arm is in the forward position or (b) the spring is configured to bias the lift arm toward the forward position when the lift arm is in the rearward position.

Another embodiment relates to a front-loading refuse vehicle including a chassis, a series of tractive elements coupled to the chassis, a refuse compartment coupled to the chassis, a lift arm coupled to the chassis and configured to engage a refuse container, the lift arm being rotatable relative to the chassis about an axis of rotation that extends laterally, and a linear actuator having a first end coupled to the chassis and a second end coupled to the lift arm. The linear actuator is configured to move the lift arm between a forward position in which the lift arm extends forward of the axis of rotation and a rearward position in which the lift arm extends rearward of the axis of rotation. The front-loading refuse vehicle further includes an electric motor coupled to the lift arm and the chassis, a sensor configured to provide sensor data indicating an angular position of the lift arm, and a controller operatively coupled to the electric motor and the sensor. The controller is configured to determine, based on the sensor data, whether the lift arm is moving downward and control the electric motor to apply a braking torque on the lift arm to oppose movement of the lift arm in response to a determination that the lift arm is moving downward.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term "lift assister" means any device that biases a lift arm of a refuse vehicle (e.g., by applying a biasing force or biasing torque) to facilitate raising a refuse container or oppose lowering of a refuse container. The lift assister may include a biasing element or spring (e.g., the torsion spring 610, the extension spring 620, the compression spring 630, etc.) that passively applies a biasing force or biasing torque based on a position of the lift arm. The lift assister may include an actuator (e.g., the electric motor 702) that converts movement of the lift arm into stored energy (e.g., by applying a braking torque) and subsequently uses the stored energy to drive movement of the lift arm.

According to an exemplary embodiment, a front-loading refuse vehicle includes a pair of lift arms that engage a refuse container. A pair of lift actuators drive rotation of the lift arms relative to the chassis to raise and dump a refuse container. When the refuse container is lowered, the potential energy of the elevated refuse container would traditionally be dissipated (e.g., as sound or heat). In the front-loading refuse vehicle described herein, a lift assister recovers a portion of this energy and uses the recovered energy to drive the lift arms. In some configurations, the lift assister includes a spring that opposes downward movement of the lift arms and biases the lift arms upward. When lowering a refuse container, the spring is strained, storing energy. The energy is released when the spring again drives the lift arms upward. In other configurations, the lift assister includes an electric motor that is driven by the lift arms to generate electrical energy when the lift arms are lowered. This electrical energy is stored in a battery, then subsequently used to drive the lift arms.

Overall Vehicle

Figure 1:
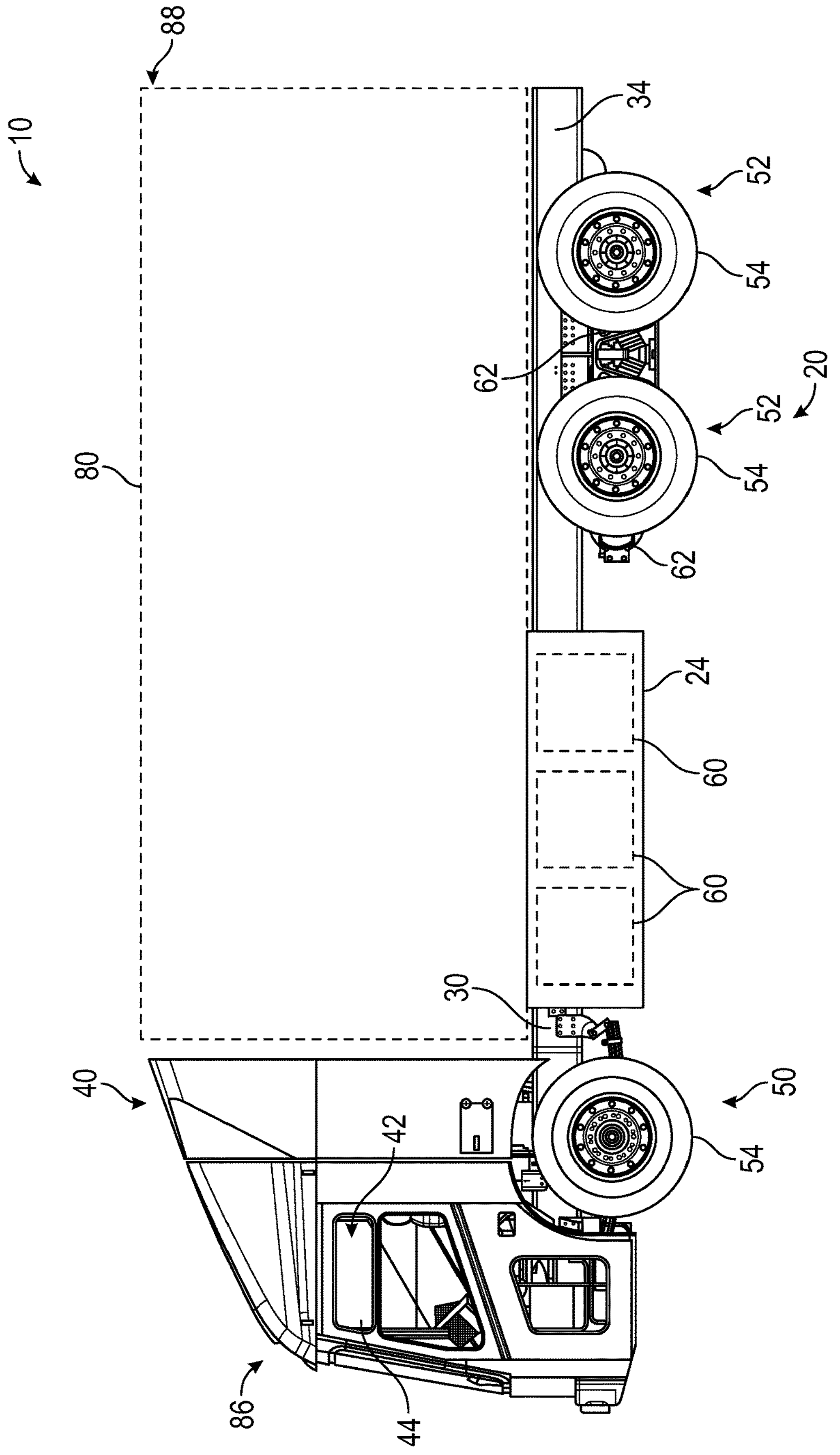
FIG. 1 is a left side view of a vehicle, according to an exemplary embodiment.
Figure 2:
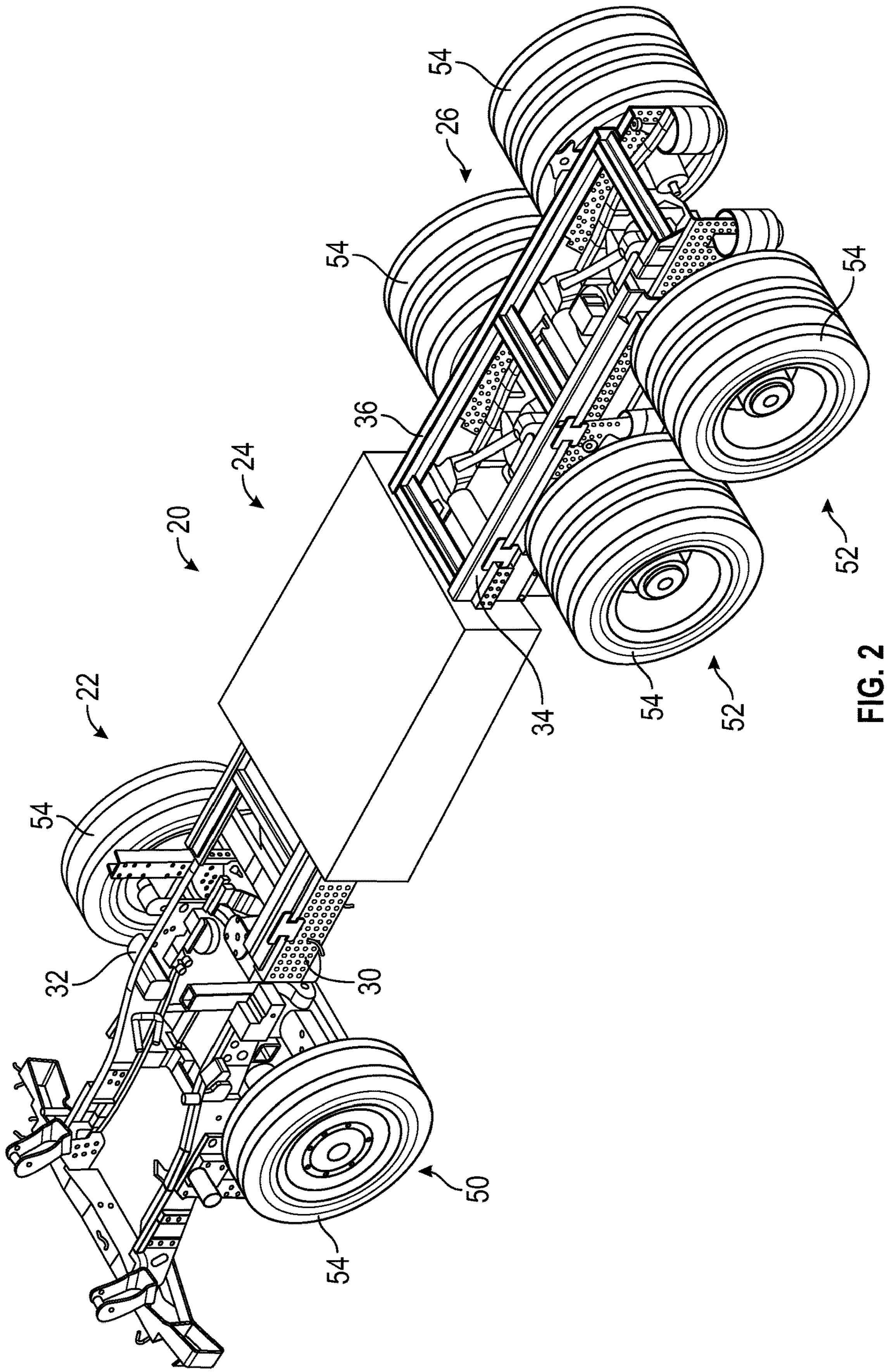
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
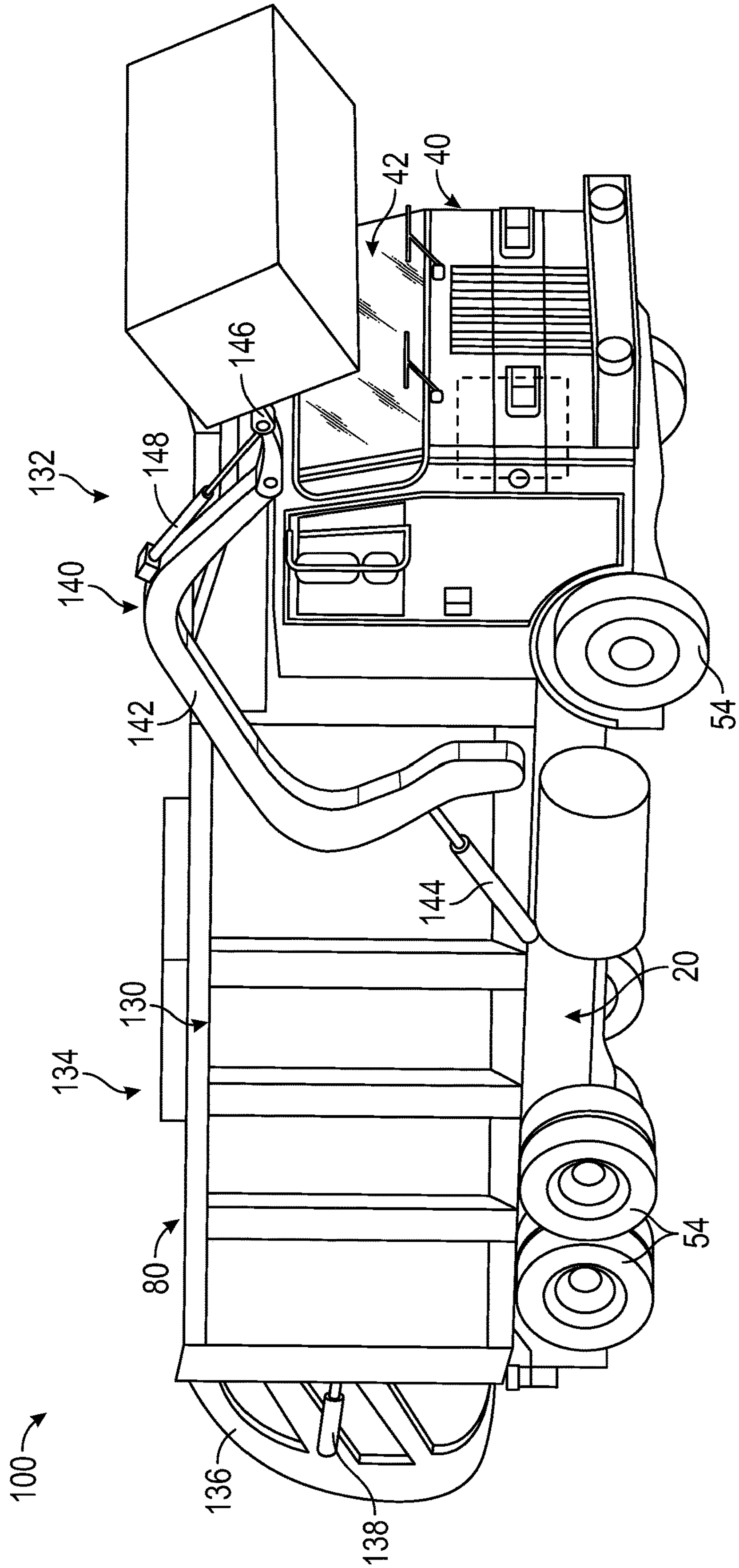
FIG. 3 is a perspective view of the vehicle of FIG. 1 configured as a front-loading refuse vehicle, according to an exemplary embodiment.
Figure 4:
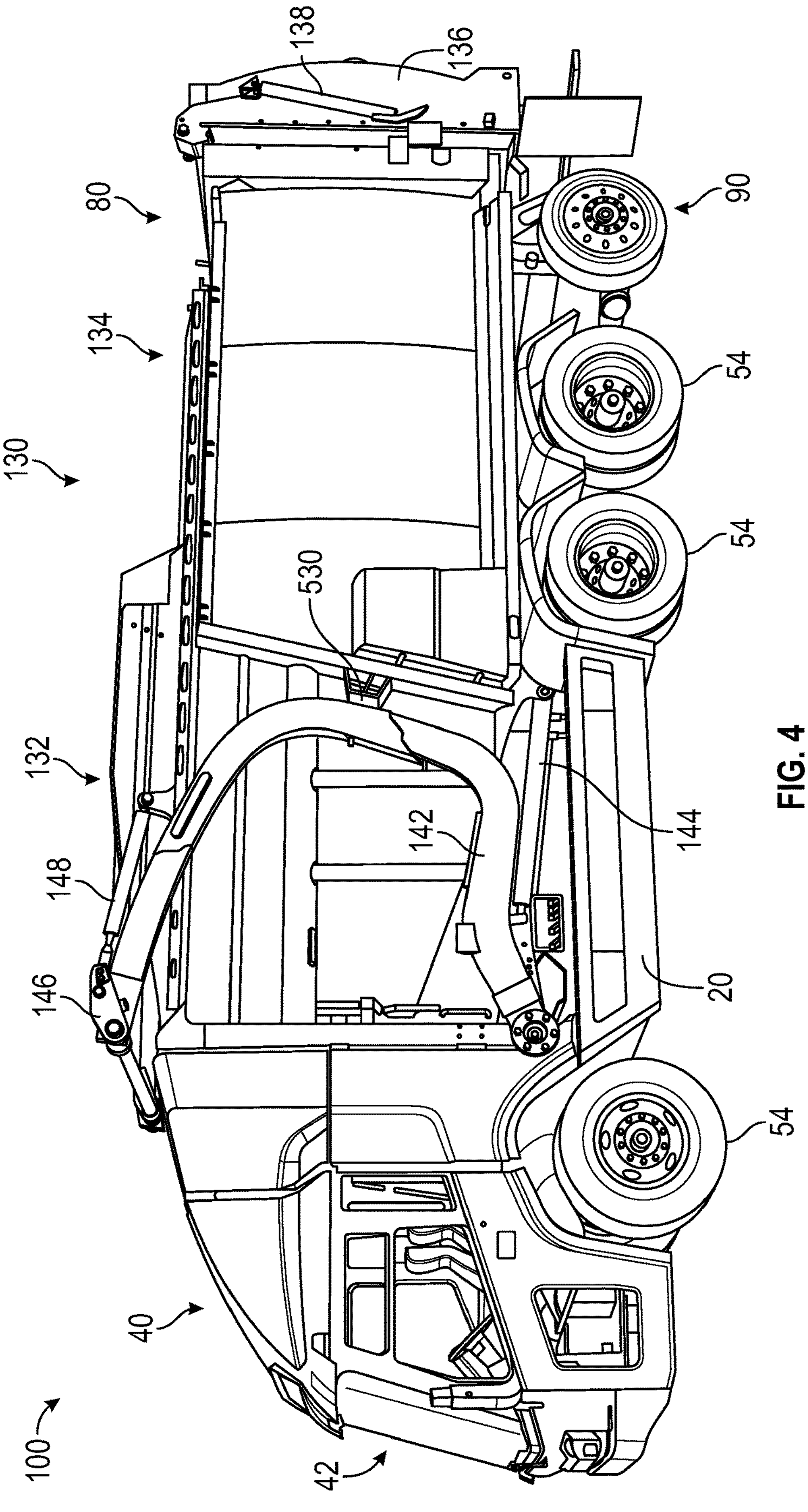
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume 134 may be positioned between the hopper volume 132 and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
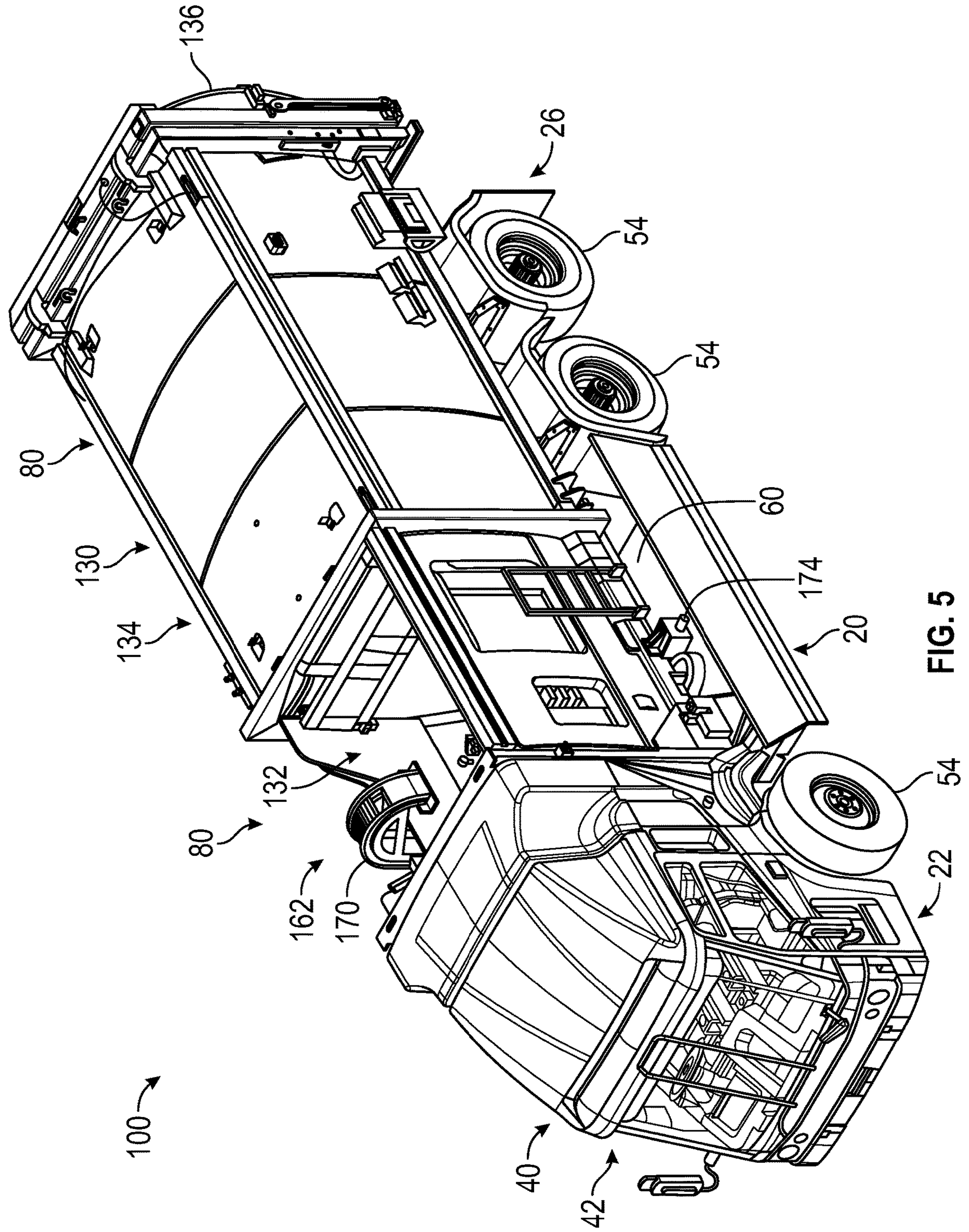
FIG. 5 is a perspective view of the vehicle of FIG. 1 configured as a side-loading refuse vehicle, according to an exemplary embodiment.
Figure 6:
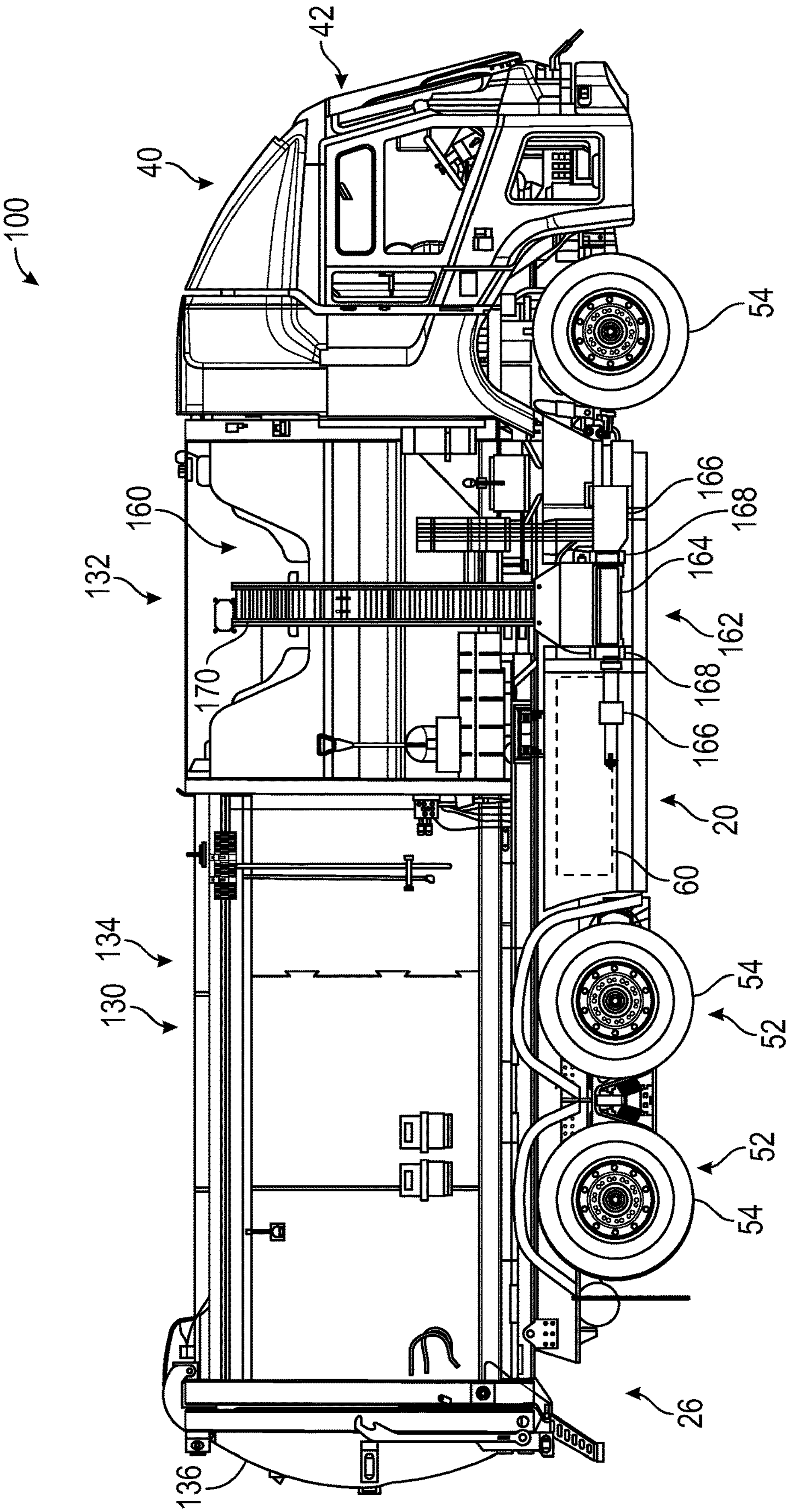
FIG. 6 is a right side view of the side-loading refuse vehicle of FIG. 5.
Figure 7:
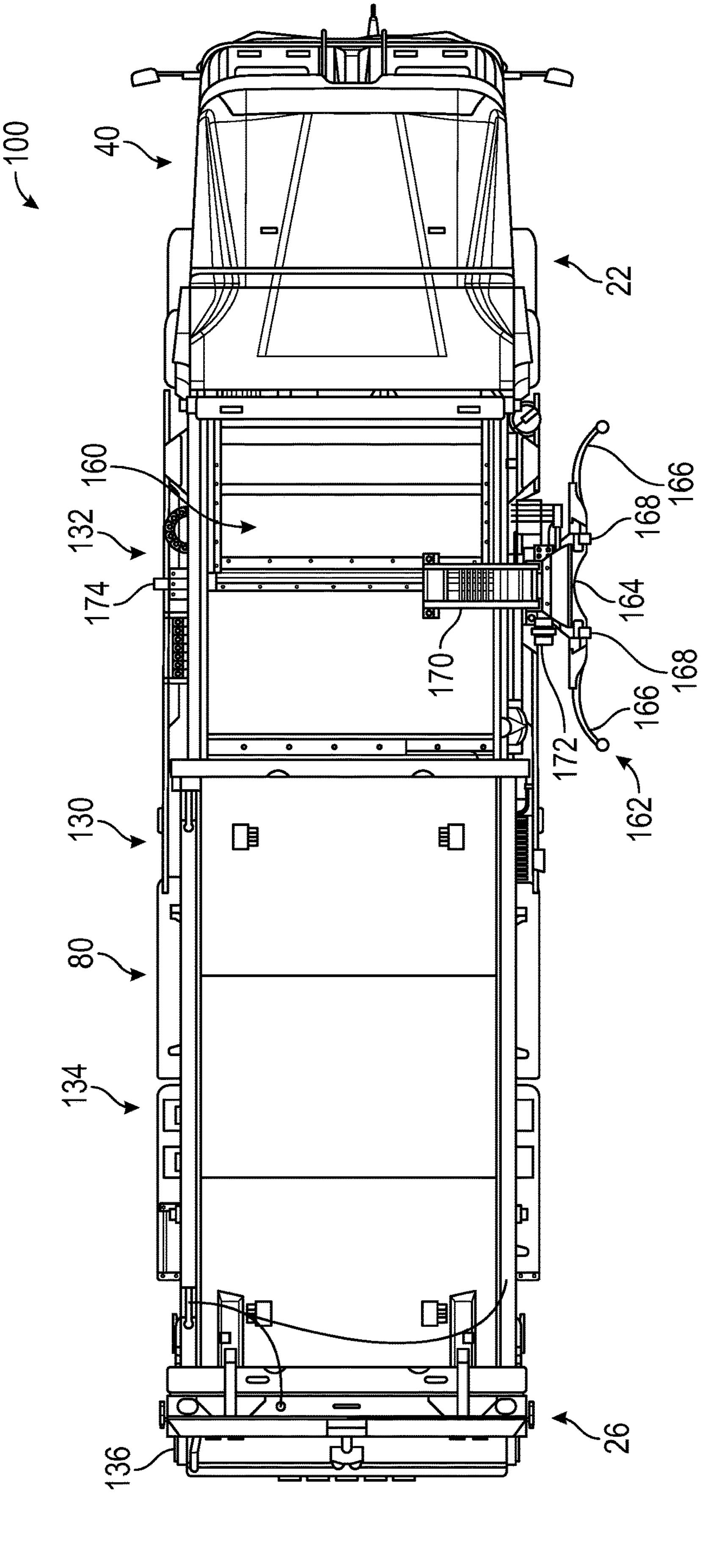
FIG. 7 is a top view of the side-loading refuse vehicle of FIG. 5.
Figure 8:
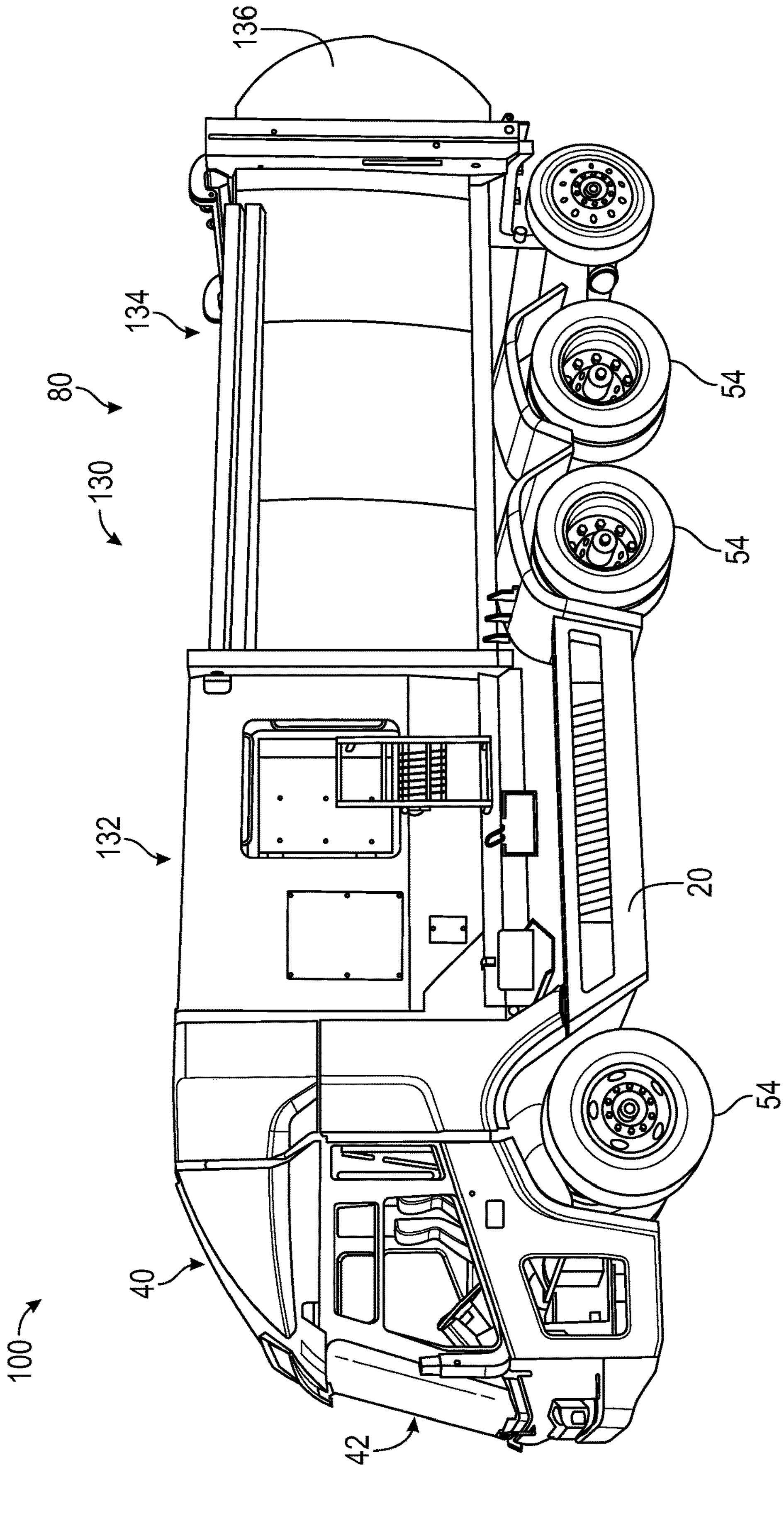
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
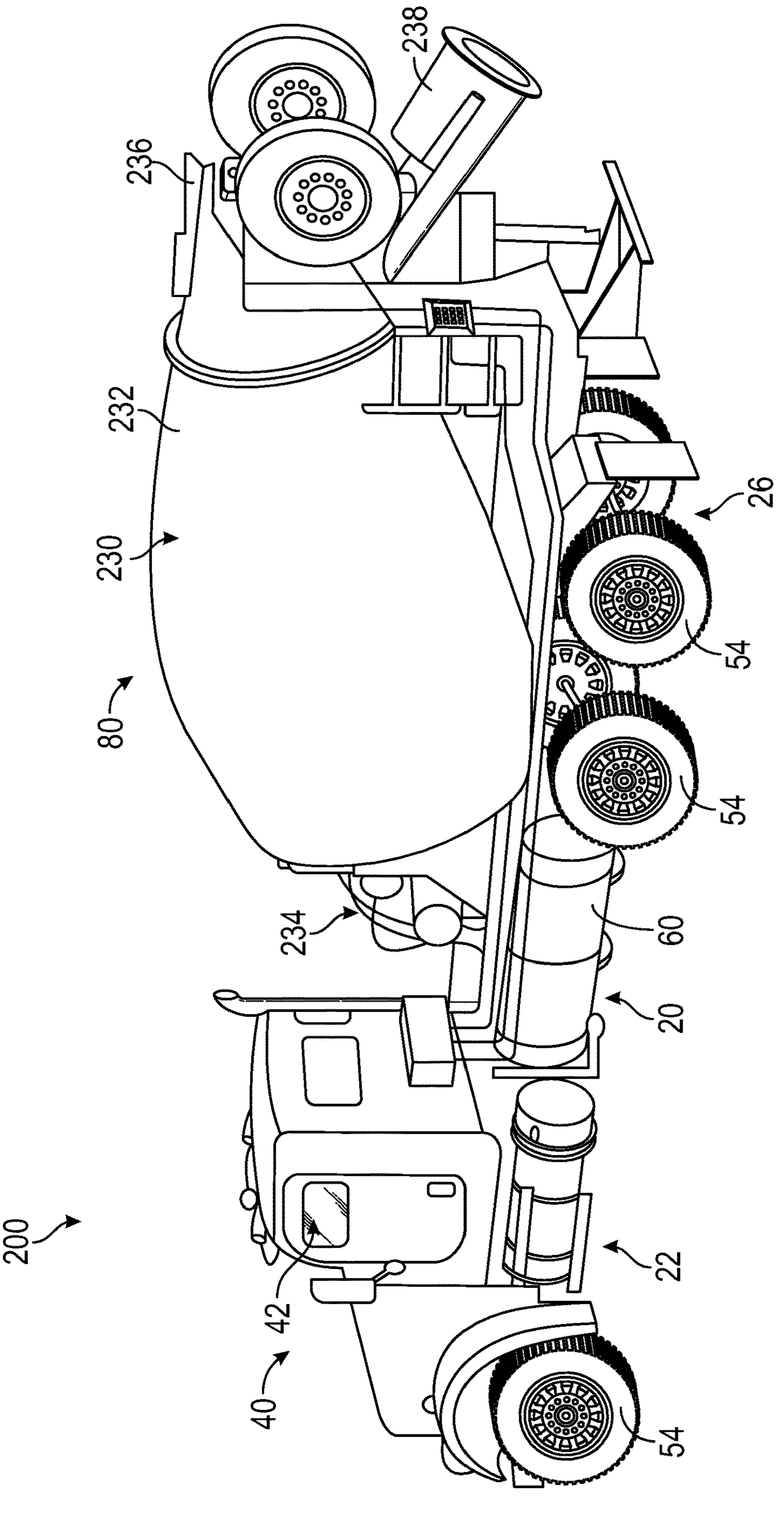
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
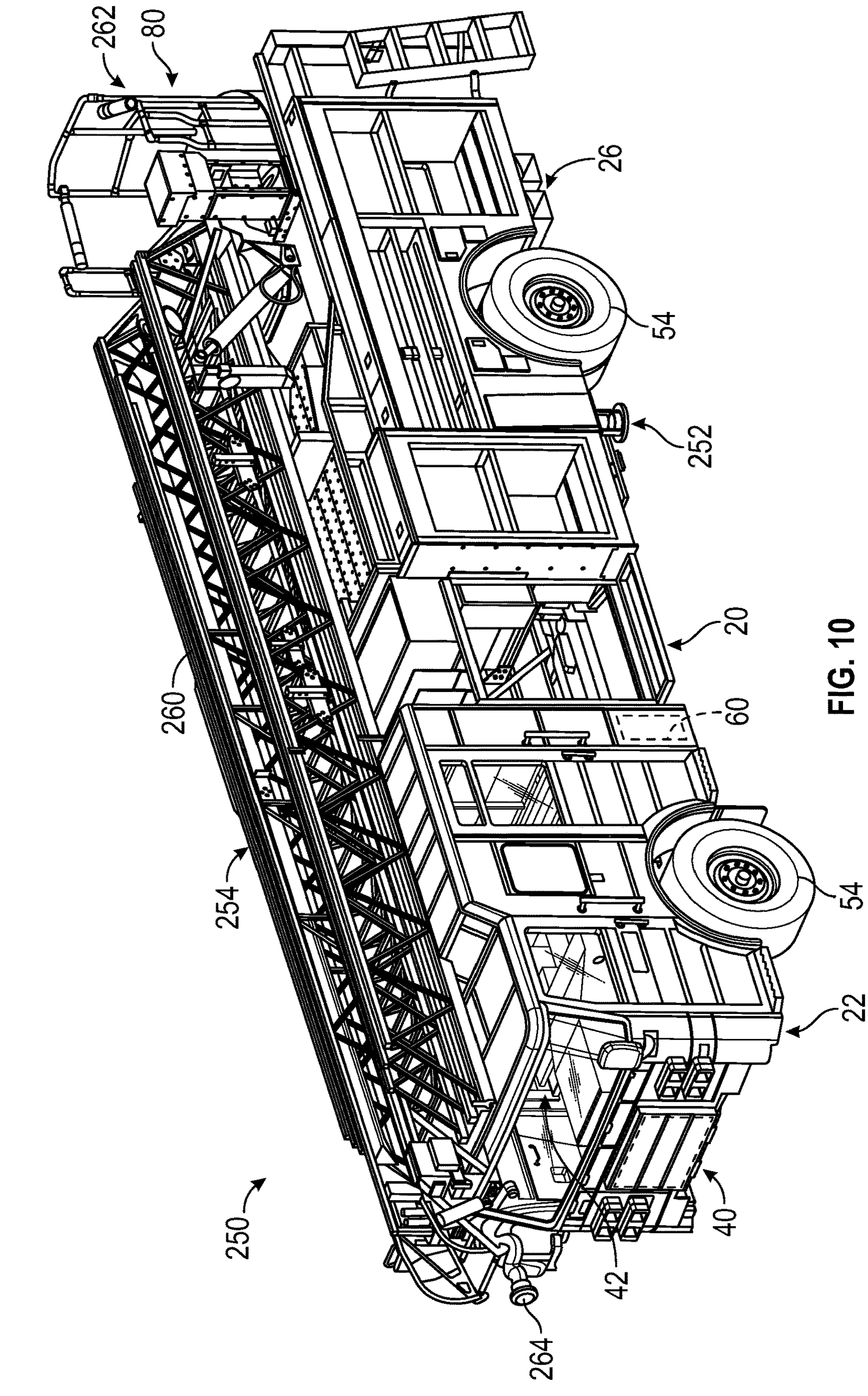
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
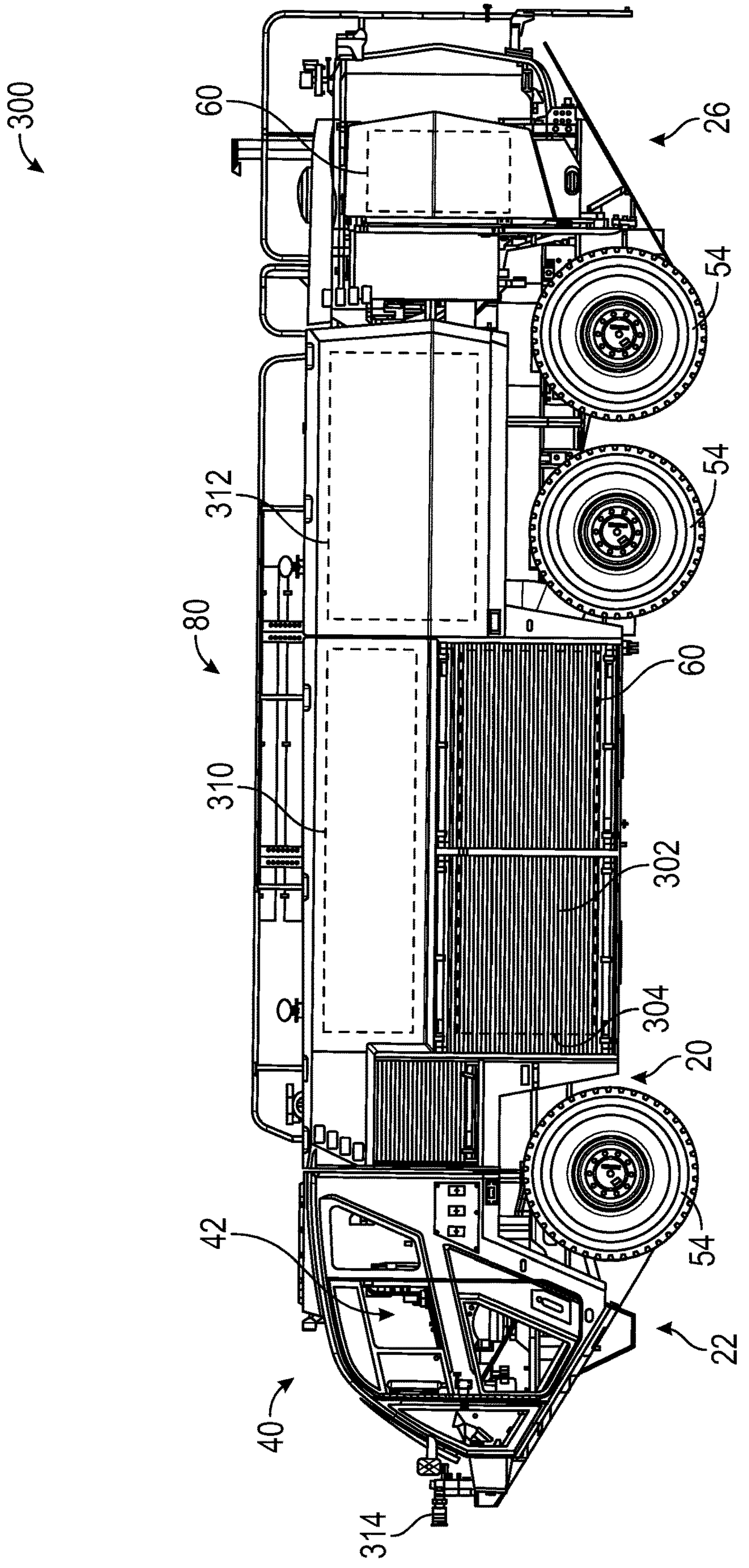
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
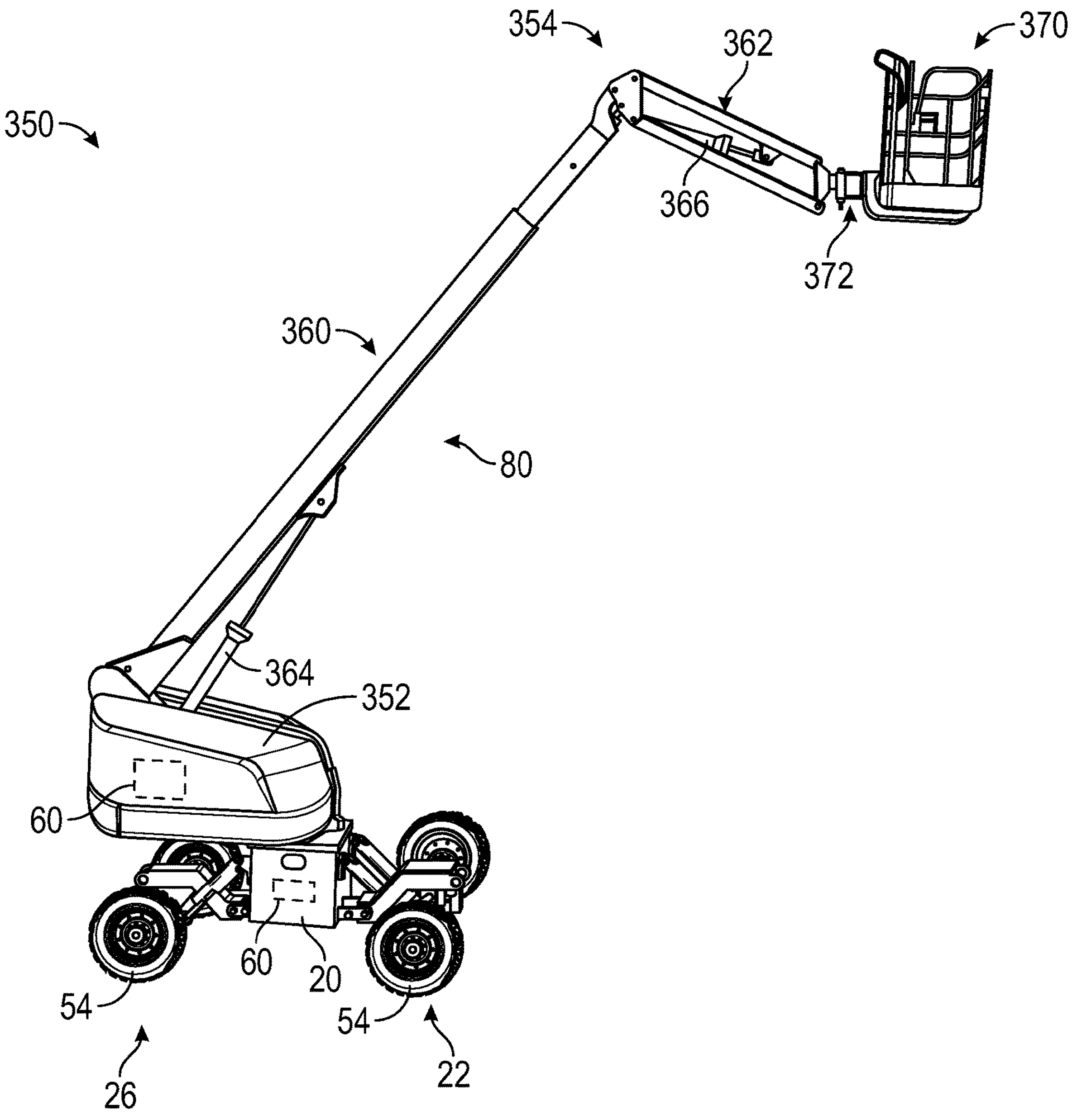
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
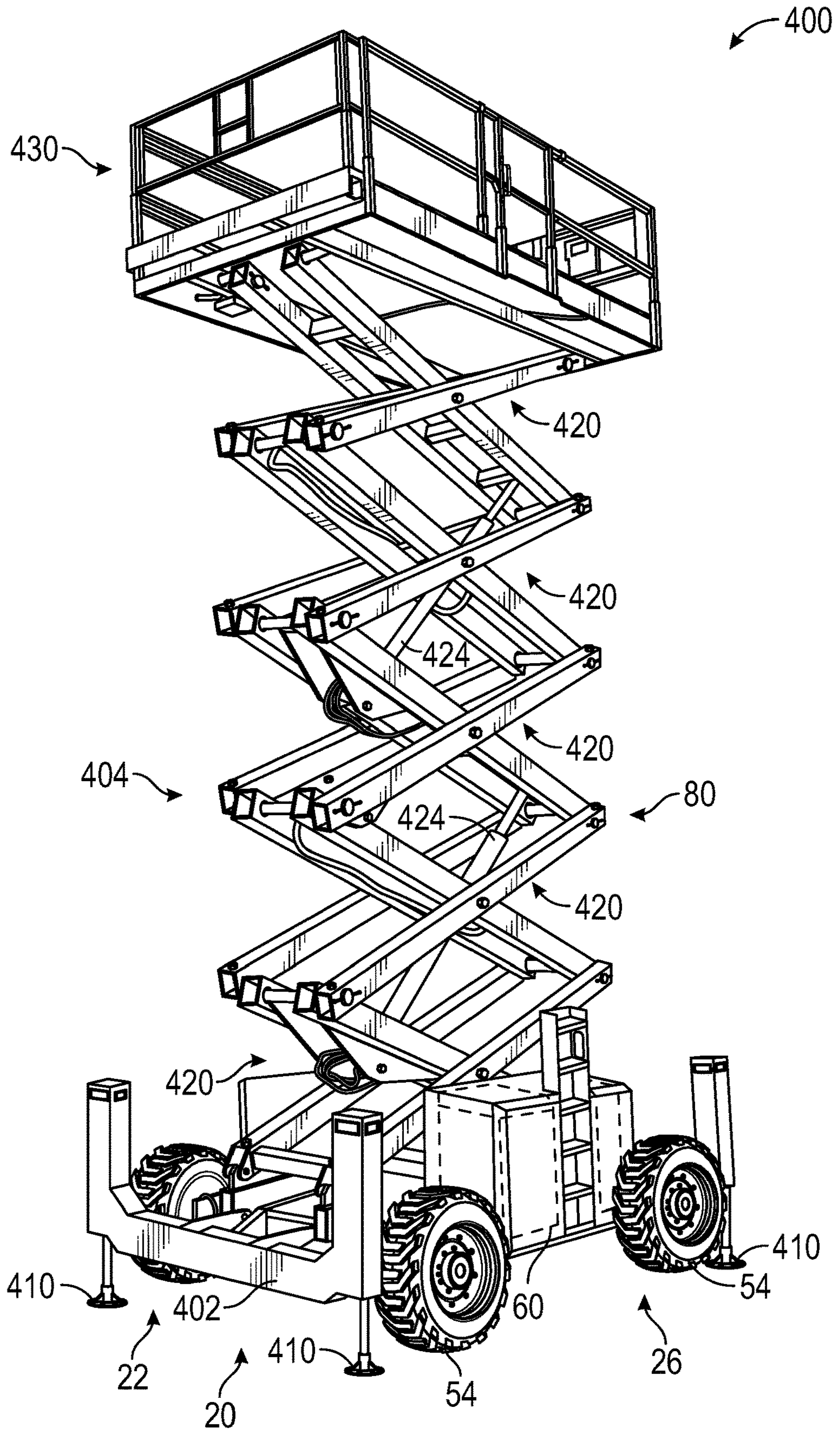
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Arm Return Assist for Front-Loading Refuse Vehicle

Figure 14:
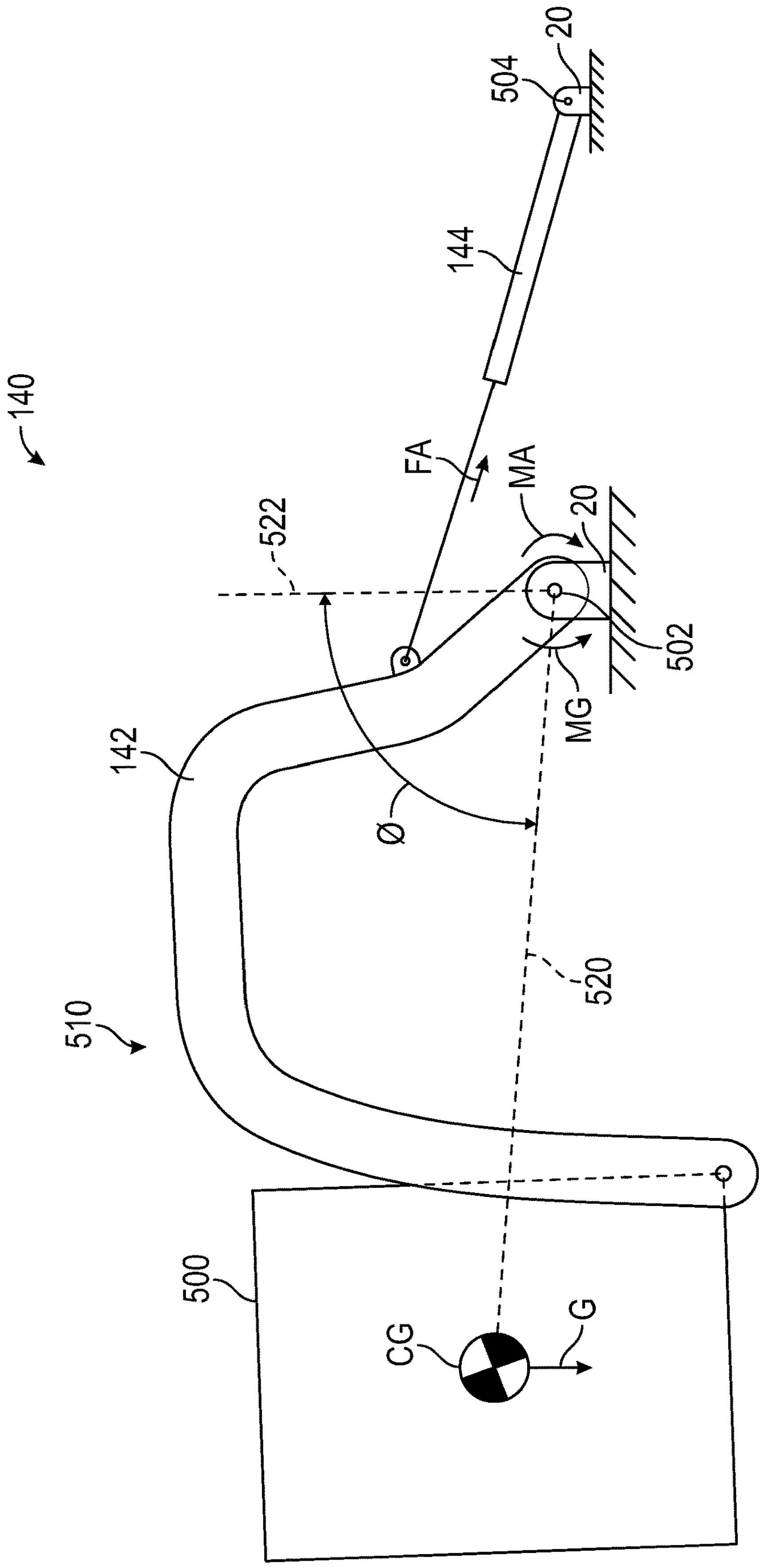
FIGS. 14-16 are side views illustrating a range of motion of a lift assembly of the front-loading refuse vehicle of FIG. 3.
Figure 15:
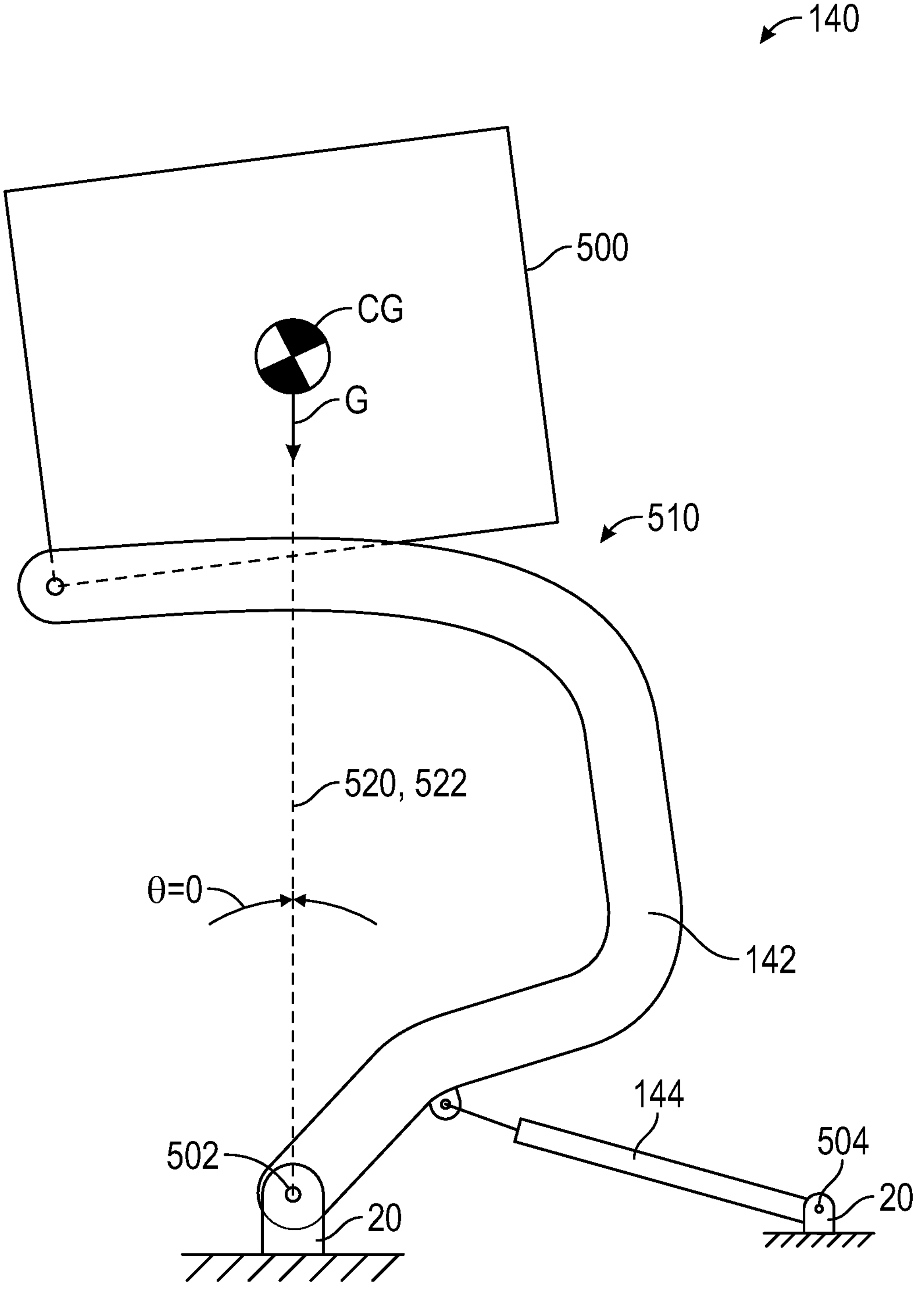
Figure 16:
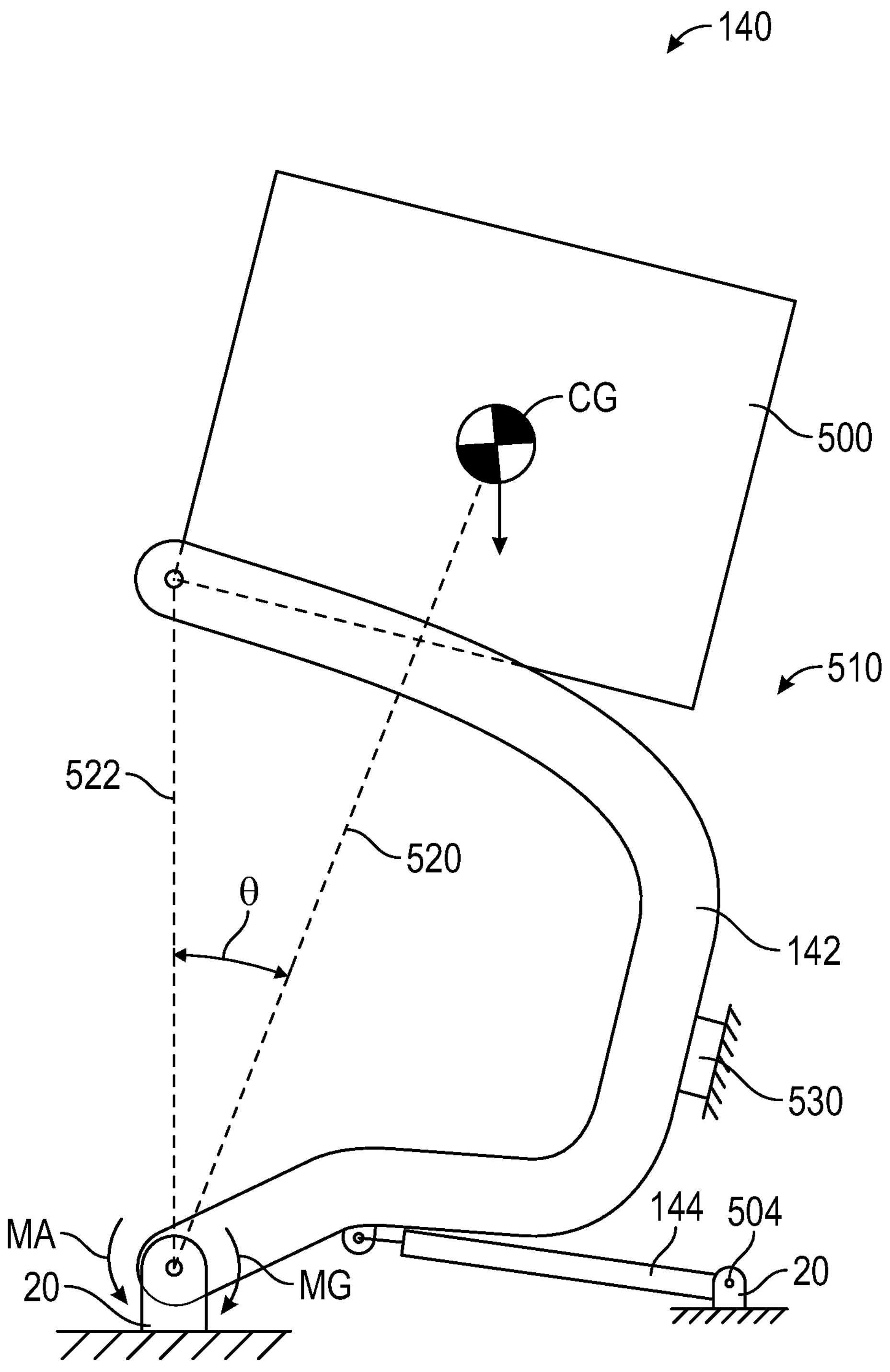

Referring to FIGS. 14-16, the lift assembly 140 of the front-loading refuse vehicle 100 is illustrated throughout the process of emptying a refuse container 500 (e.g., a dumpster). The refuse container 500 may be filled with a volume of refuse when the refuse container 500 is engaged by the lift assembly 140. By way of example, a customer may load the refuse container 500 with refuse that the customer desires to be removed. A combination of a weight of the refuse container 500 and a weight of the refuse within the refuse container 500 may be referred to as a "filled weight." The numerical value of the filled weight may vary based upon the type of refuse container used (e.g., the capacity, the material, the manufacturer, etc.), the type of refuse within the refuse container 500, and the amount of refuse within the refuse container 500.

Throughout the range of motion, the lift arms 142 and the refuse container 500 rotate about a substantially horizontal, lateral axis shown as axis of rotation 502. The axis of rotation 502 may be fixed relative to the chassis 20. The rotation of the lift arms 142 and the refuse container 500 about the axis of rotation 502 is controlled by the lift arm actuators 144. Specifically, the lift arm actuators 144 extend or retract, imparting a force on the lift arms 142 that has a corresponding moment effect on the lift arms 142 and the refuse container. Throughout the range of motion, the lift arm actuators 144 rotate relative to the chassis 20 about an axis of rotation 504.

FIGS. 14-16 illustrate a lifted mass 510 that is rotated about the axis of rotation 502. Specifically, the lifted mass 510 collectively represents all of the components that are moved by the lift arm actuators 144. By way of example, the lifted mass 510 may include the lift arms 142, the lift forks 146, the articulation actuators 148, the refuse container 500, and the refuse within the refuse container. The lifted mass 510 has a center of gravity CG that moves about the axis of rotation 502. A gravitational force G acts downward at the center of gravity CG. In some embodiments, the filled weight of the refuse container 500 is sufficiently large that the center of gravity CG of the lifted mass 510 is at approximately the same position as the center of gravity of the refuse container 500 and the refuse.

When the center of gravity CG is longitudinally offset from the axis of rotation 502, the gravitational force G imparts a moment loading, shown as moment MG, on the lifted mass 510. The magnitude of the gravitational force G may remain substantially constant (e.g., until refuse is added or removed), but the longitudinal position of the center of gravity CG may vary as the lift arms 142 rotate, varying the magnitude of the moment MG. As shown in FIGS. 14-16, an axis 520 extends between the axis of rotation 502 and the center of gravity CG. A vertical axis 522 intersects the axis of rotation 502. An angle Θ is defined between the axis 520 and the vertical axis 522. As the size of the angle Θ increases (e.g., up to 90 degrees in either direction), the length of the effective moment arm between the gravitational force G and the axis of rotation 502 increases. Accordingly, as the size of the angle Θ increases, the magnitude of the moment MG increases.

The lift arm actuators 144 impart an actuator force FA on the lift arms 142. The actuator force FA may represent the total force imparted by both of the lift arm actuators 144. The force of each lift arm actuator 144 may act along the length of the lift arm actuator 144. The lift arm actuators 144 are offset from the axis of rotation 502, such that the actuator force FA imparts a moment loading, shown as moment MA, on the lifted mass 510. The moment MA may act in the opposite direction as the moment MG to hold the lifted mass 510 in a desired position or to raise the lifted mass 510.

FIG. 14 illustrates the lift assembly 140 when the refuse container is initially engaged by the lift assembly 140 and raised from the ground or another support surface (e.g., a pickup position). The pickup position may represent the first point throughout the range of motion of the lift assembly 140 where the entirety of the filled weight is supported by the lift assembly 140. In the pickup position, the center of gravity CG is positioned forward of the axis of rotation 502. Accordingly, the gravitational force G imparts a positive moment MG on the lifted mass 510. To counteract the positive moment MG, the lift arm actuators 144 may apply an actuator force FA in a retracting direction, resulting in a negative moment MA. In some embodiments, the pickup position has the largest angle Θ of any point throughout the range of motion of the lift arms 142. Accordingly, the moment MA required to counteract the moment MG may be largest in the pickup position.

As the refuse container 500 is raised, the lift arm actuators 144 retract, causing the lift arms 142 to rotate rearward. As the lift arms 142 move rearward, the center of gravity CG moves upward and rearward. This movement is opposed by the direction of the gravitational force G (i.e., the lifted mass 510 moves against gravity), such that the moment MA must be greater than the moment MG. As the center of gravity CG moves upward, the angle Θ decreases, deceasing the magnitude of the moment MG. Accordingly, the moment MA required from the lift arm actuators 144 decreases as the CG moves upward.

FIG. 15 illustrates the lift assembly 140 in a balanced position in which the lifted mass 510 is balanced above the axis of rotation 502. In the balanced position, the center of gravity CG aligns with the vertical axis 522 (e.g., the center of gravity CG is positioned at the same longitudinal position as the axis of rotation 502). In the balanced position, the gravitational force G imparts a negligible moment (e.g., the angle Θ and the moment MG are equal to zero). Because the moment MG is close to zero, the moment MA required to counteract the moment MG is also close to zero.

As the refuse container 500 moves beyond the balanced position, the lift arm actuators 144 continue to retract, causing the lift arms 142 to rotate rearward. As the lift arms 142 move rearward, the center of gravity CG moves downward and rearward. This movement is aided by the direction of the gravitational force G (i.e., the lifted mass 510 moves with gravity), such that the moment MG will cause the center of gravity CG to move rearward unless opposed by the lift arm actuators 144. As the center of gravity CG moves downward, the angle Θ increases, increasing the magnitude of the moment MG.

FIG. 16 illustrates the lift assembly 140 in a dumping position in which refuse is discharged from the refuse container 500 into the hopper volume 132. The dumping position may represent the most rearward position of the range of motion of the lift arms 142. In the dumping position, the center of gravity CG is positioned rearward of the axis of rotation 502. Accordingly, the gravitational force G imparts a negative moment MG on the lifted mass 510. To counteract the negative moment MG, the lift arm actuators 144 may apply an actuator force FA in an extending direction, resulting in a positive moment MA. In some embodiments, the refuse compartment 130 includes a pair of bumpers or hard stops, shown as lift arm stops 530, that are positioned to engage the lift arms 142 when the lift assembly 140 is in the dumping position. The lift arm stops 530 support the lifted mass 510 and prevent the lift arms 142 from moving further rearward.

With the refuse unloaded from the refuse container 500, the lifted mass 510 is considerably smaller, requiring less force to move. To return the emptied refuse container 500 to the ground, the lift arm actuators 144 are extended, imparting a positive moment MA on the lifted mass 510 and overcoming the negative moment MG. The lifted mass 510 moves forward toward the balanced position. It should be understood that the exact location of the balanced position may vary between when the refuse container 500 is loaded and when the refuse container 500 is unloaded, as the position of the center of gravity CG may shift. After passing the balanced position, the direction of the moment MG inverts to be a positive moment. At this point, the lifted mass 510 moves with gravity toward the pickup position.

Figures 17, 18:
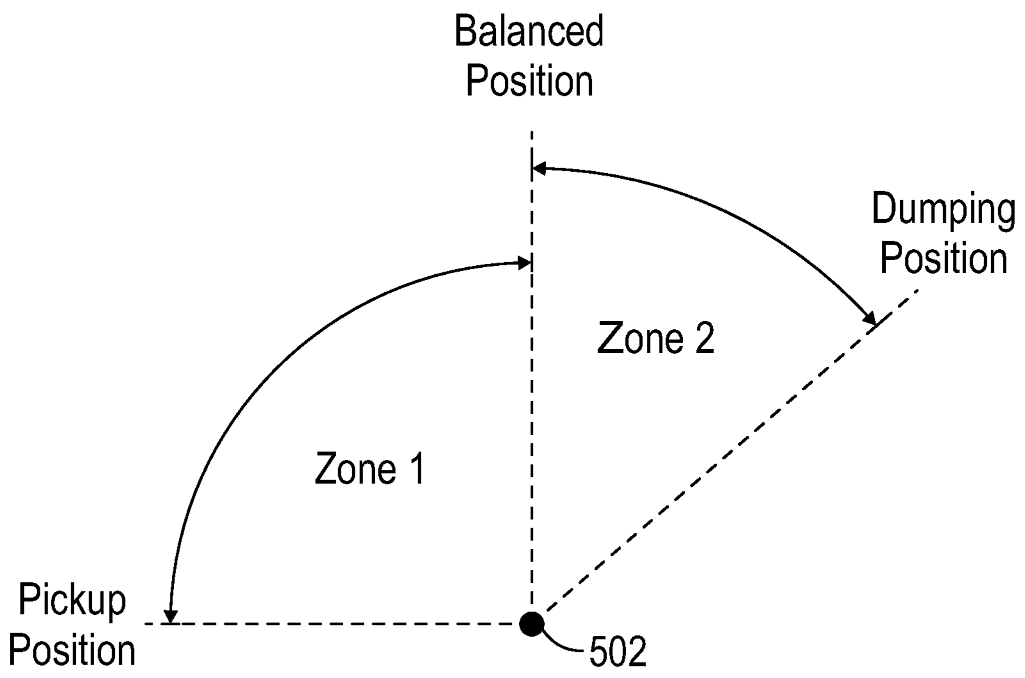
FIG. 17 is a diagram illustrating the range of motion of the lift assembly of FIG. 14.
FIG. 18 is a table describing the range of motion of the lift assembly of FIG. 14.

FIGS. 17 and 18 summarize the process of lifting and emptying a refuse container into four steps. The range of motion of the lift arms 142 is divided into two zones or ranges of positions: a first zone (i.e., zone 1) between the pickup position and the balanced position; and a second zone (i.e., zone 2) between the balanced position and the dumping position.

In step 1, the lift assembly 140 begins the process of dumping the refuse. The lifted mass 510 is moved throughout zone 1 while loaded with refuse. Throughout step 1, the lift assembly 140 is moving against gravity, such that an energy input is required to raise the lifted mass 510.

In step 2, the lift assembly 140 completes the process of dumping the refuse. The lifted mass 510 is moved throughout zone 2 while loaded with refuse. Throughout step 2, the lift assembly 140 moves with gravity, such that the potential energy of the lifted mass 510 is capable of moving the lifted mass 510 throughout zone 1 without an additional input from the lift arm actuators 144. The lift arm actuators 144 may apply a braking force to reduce the speed of the lifted mass 510. Alternatively, the lift arm actuators 144 may apply an additional driving force to increase the speed of the lifted mass 510 beyond the capabilities of the gravitational force G (e.g., to more effectively shake the refuse out of the refuse container 500).

In step 3, the lift assembly 140 has completed dumping the refuse and begins the process of returning the refuse container 500 to the ground. The lifted mass 510 is moved throughout zone 2 while unloaded (e.g., without any refuse). Throughout step 2, the lift assembly 140 is moving against gravity, such that an energy input is required to raise the lifted mass 510. The energy required to lift the lifted mass 510 in step 3 may be less than the energy required in step 1 due to the refuse container 500 being unloaded.

In step 4, the lift assembly 140 completes the process of returning the refuse container 500 to the ground. The lifted mass 510 is moved throughout zone 1 while unloaded. Throughout step 4, the lift assembly 140 moves with gravity, such that the potential energy of the lifted mass 510 is capable of moving the lifted mass 510 throughout zone 1 without an additional input from the lift arm actuators 144. The lift arm actuators 144 may apply a braking force to reduce the speed of the lifted mass 510.

Spring Assist

Figure 20:
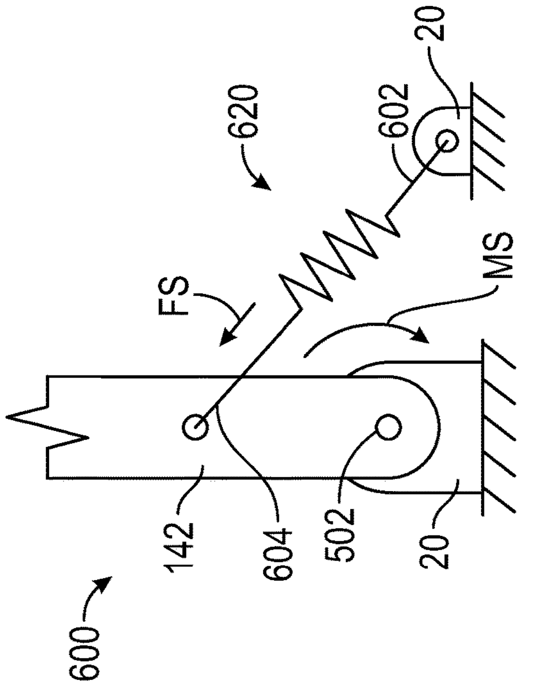
FIGS. 19-21 are side views of a spring assist system for use with the lift assembly of FIG. 14, according to various exemplary embodiments.
Figure 21:
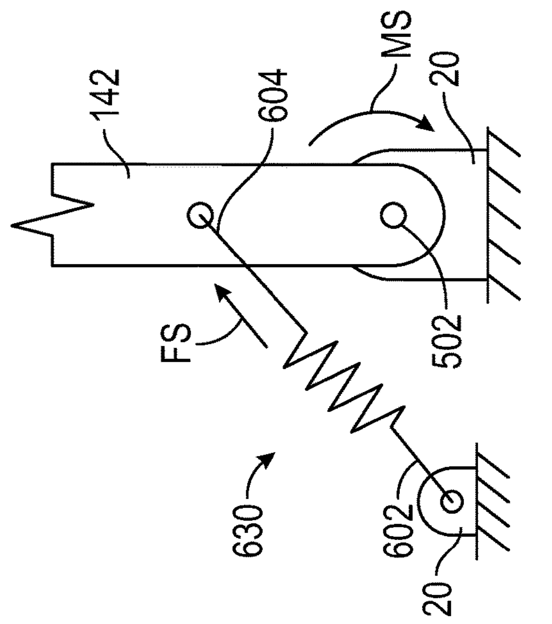
Figure 19:
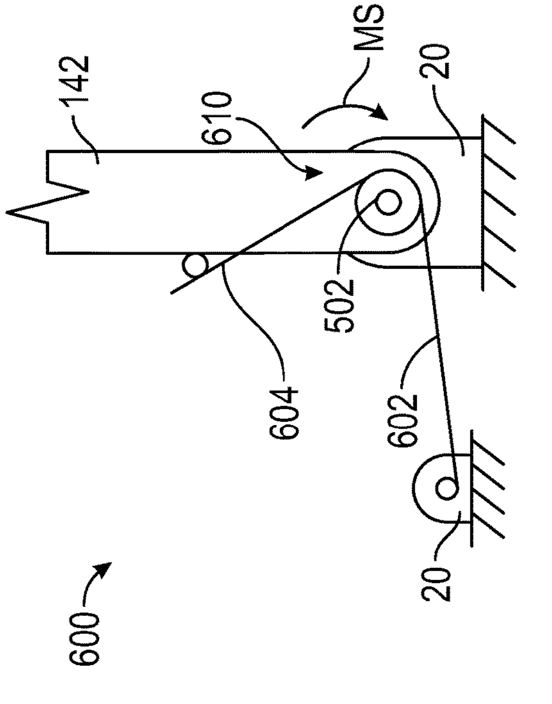

Referring to FIGS. 19-21, in some embodiments, the refuse vehicle 100 includes an energy recovery system, spring bias system, arm return assist system, lift assister, or lift assist system, shown as spring assist system 600. The spring assist system 600 is configured to utilize biasing elements, such as springs, to facilitate movement of the lift arms 142 under load. The spring assist system 600 may store energy when the force required from the lift arm actuators 144 is low (e.g., when the lifted mass 510 is near the balancing position, when the lifted mass 510 is moving with gravity, etc.) and use the stored energy to move the lifted mass 510 when the force required from the lift arm actuators 144 is high (e.g., when the lifted mass 510 is near the pickup position or the dumping position, when the lifted mass 510 is moving against gravity, etc.). In this way, the spring assist system 600 may improve the energy efficiency of the lift assembly 140 (e.g., by storing energy instead of dissipating the energy as sound, vibrations, or heat). The spring assist system 600 may reduce the maximum force required by the lift arm actuators 144, facilitating the use of smaller and lower cost components.

As shown in FIGS. 19-21, the spring assist system 600 may utilize a variety of different biasing elements. Each of the biasing elements includes a first portion or fixed portion, shown as anchor portion 602, that is coupled to the chassis 20 and a second portion or moving portion, shown as arm portion 604, that is coupled to the lift arms 142. The biasing element is configured to provide a biasing force or biasing torque that varies based on a distance between the anchor portion 602 and the arm portion 604. This biasing force or biasing torque results in a spring moment or biasing moment, shown throughout the figures as moment MS. Although certain embodiments are described herein as utilizing one biasing element, it should be understood that other embodiments utilize multiple of the biasing elements arranged in parallel with one another (e.g., one biasing element for each lift arm 142).

The anchor portion 602 may be removably coupled to the chassis 20, and the arm portion 604 may be removably coupled to the lift arms 142. By way of example, if the lift arms 142 were to move a threshold distance in a first direction (e.g., such that the biasing element became completely relaxed or unstressed), the anchor portion 602 may lift away from the chassis 20 and/or the arm portion 604 may lift away from the lift arms 142.

In FIG. 19, the spring assist system 600 utilizes a torsional biasing element (e.g., a torsion bar, a helical or coil torsion spring, etc.), shown as torsion spring 610. The torsion spring 610 includes an anchor portion 602, shown as a first leg, that is coupled to the chassis 20. The torsion spring 610 includes an arm portion 604, shown as a second leg, that is coupled to the lift arms 142. The torsion spring 610 is centered about the axis of rotation 502. The torsion spring 610 is configured to impart a biasing torque on the lift arms 142 that varies based on a relative angular position of the anchor portion 602 and the arm portion 604.

In FIG. 20, the spring assist system 600 utilizes a tensile biasing element (e.g., a helical or coil tension spring, an extension spring, a tension gas spring, etc.), shown as extension spring 620. The extension spring 620 includes an anchor portion 602, shown as a first end, that is coupled to the chassis 20. The extension spring 620 includes an arm portion 604, shown as a second end, that is coupled to the lift arms 142. The extension spring 620 applies a spring force FS offset from the axis of rotation 502. The spring force FS results in the moment MS. The spring force FS varies based on a distance between the anchor portion 602 and the arm portion 604. Specifically, the spring force FS increases as the distance between the anchor portion 602 and the arm portion 604 increases.

In FIG. 21, the spring assist system 600 utilizes a compressive biasing element (e.g., a helical or coil compression spring, a block of compliant material, such as rubber, a compression gas spring, etc.), shown as compression spring 630. The compression spring 630 includes an anchor portion 602, shown as a first end, that is coupled to the chassis 20. The compression spring 630 includes an arm portion 604, shown as a second end, that is coupled to the lift arms 142. The extension spring 620 applies a spring force FS offset from the axis of rotation 502. The spring force FS results in the moment MS. The spring force FS varies based on a distance between the anchor portion 602 and the arm portion 604. Specifically, the spring force FS increases as the distance between the anchor portion 602 and the arm portion 604 decreases.

Single Spring—Lift Assist

Figure 22:
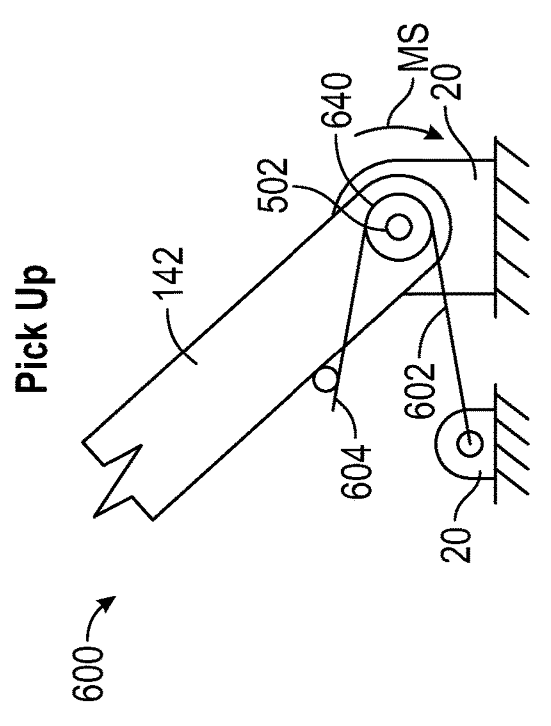
FIGS. 22-24 are side views of a spring assist system throughout the range of motion of the lift assembly of FIG. 14, according to an exemplary embodiment.
Figure 23:
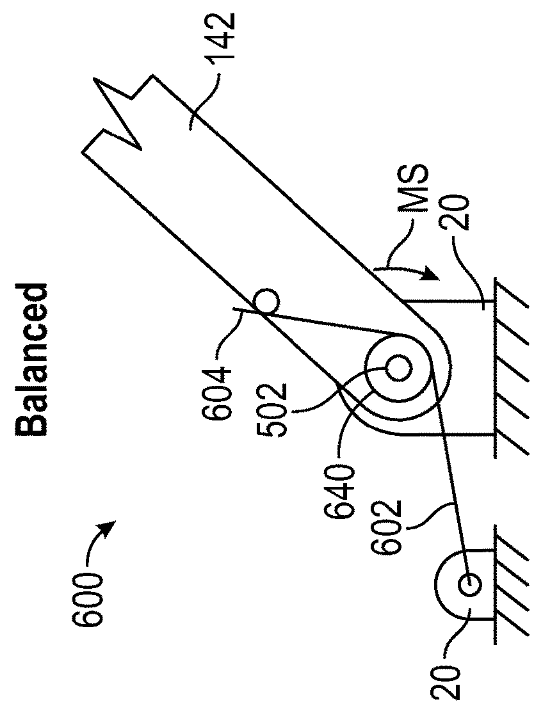
Figure 24:
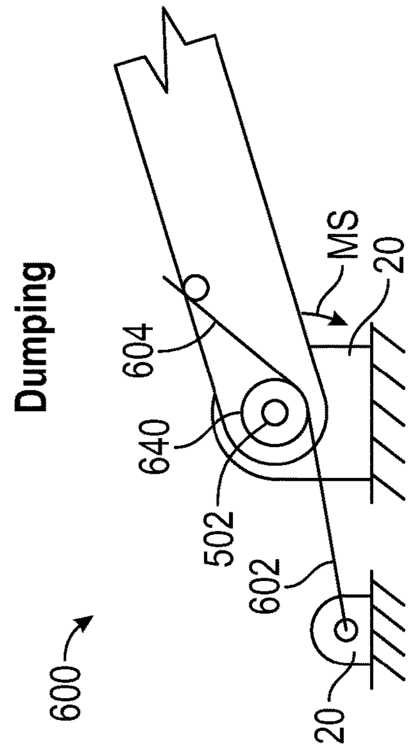
Figure 25:
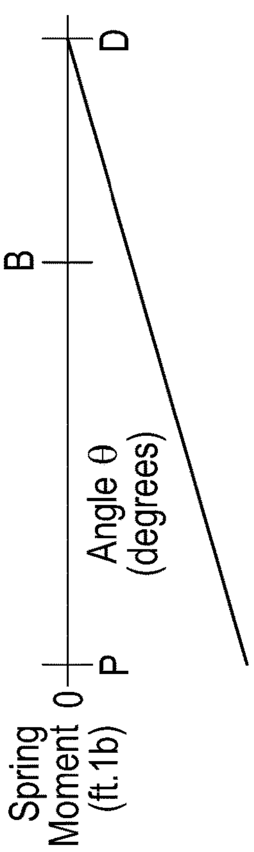
FIG. 25 is a graph illustrating a spring moment applied by the spring assist system of FIG. 22 throughout the range of motion, according to an exemplary embodiment.

FIGS. 22-25 illustrate the operation of the spring assist system 600 according to an exemplary embodiment. FIGS. 22-24 illustrate the spring assist system 600 in the pickup, balance, and dumping positions, respectively. FIG. 25 is a graph illustrating the change in spring moment MS with respect to the angle Θ. FIG. 25 illustrates the spring moment at the pickup position (P), the balanced position (B), and the dumping position (D). The angle Θ may be equal to zero degrees at the balanced position.

In the embodiment of FIGS. 22-25, the spring assist system 600 includes a torsion spring 640. The torsion spring 640 may be substantially similar to the torsion spring 610, except as otherwise specified. The spring rate (e.g., spring constant) of the torsion spring 640 and the pretension on the torsion spring 640 (e.g., the minimum force provided by the torsion spring 640) may be selected to provide the response shown in FIG. 25. The torsion spring 640 is configured to impart a spring moment MS on the lift arms 142 based on the position of the lift arms 142 relative to the chassis 20. As shown in FIG. 25, the spring moment MS is negative throughout the range of motion of the lift arms 142. The maximum spring moment MS occurs at the pickup position, and the minimum spring moment MS occurs at the dumping position. The spring moment MS decreases linearly as the angle Θ increases. As shown, the minimum spring moment MS is zero, such that the torsion spring 640 does not apply a moment when the lift arms 142 reach the dumping position. In other embodiments, the pretension on the torsion spring 640 is adjusted to increase the magnitude of the moment MS at the dumping position.

Referring to FIGS. 17 and 18, in step 1 of the process for emptying the refuse container 500, the torsion spring 640 provides a negative moment MS that counteracts the moment MG of the gravitational force G. This reduces the force that the lift arm actuators 144 are required to provide to lift the lifted mass 510, permitting the use of smaller and more cost-effective actuators. In step 2, the torsion spring 640 continues to provide the negative moment MS. The magnitude of the moment MS in step 2 may be less than the magnitude of the moment MS in step 1. In step 2, the negative moment MS may increase the force with which the refuse is shaken out of the refuse container 500. In step 3, the lift arm actuators 144 overcome both the moment MG of the gravitational force G and the moment MS of the torsion spring 640 to return the lift arms 142 to the balanced position.

In step 4, the moment MS of the torsion spring 640 opposes the moment MG of the gravitational force. Depending upon the weight of the refuse container 500 without the refuse and the characteristics of the torsion spring 640, the moment MG may be sufficient to overcome the moment MS of the torsion spring 640, or the lift arm actuators 144 may supplement the moment MG. As the lift arms 142 move to the pickup position, the torsion spring 640 stores energy that can later be used to raise another refuse container 500. Accordingly, the torsion springs 640 improve the energy efficiency of the lift assembly 140 by recovering energy that would otherwise be wasted.

Single Spring—Return Assist

Figure 26:
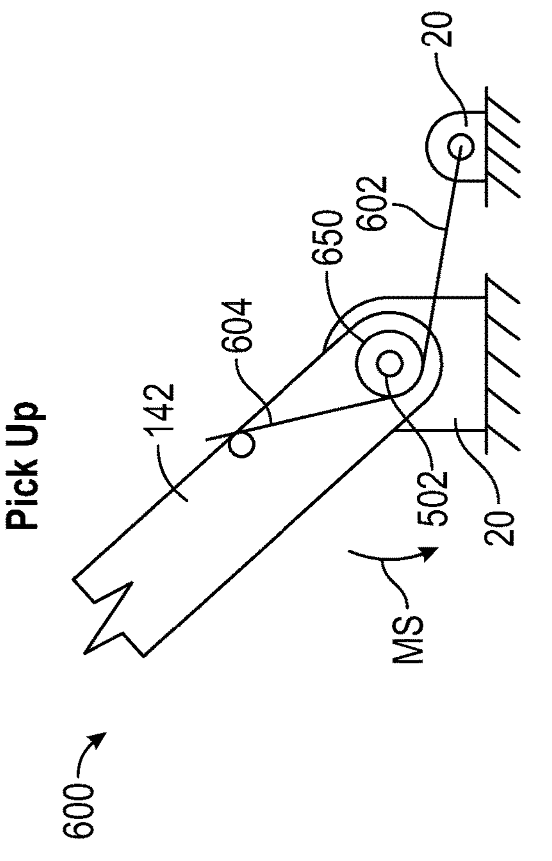
FIGS. 26-28 are side views of a spring assist system throughout the range of motion of the lift assembly of FIG. 14, according to another exemplary embodiment.
Figure 27:
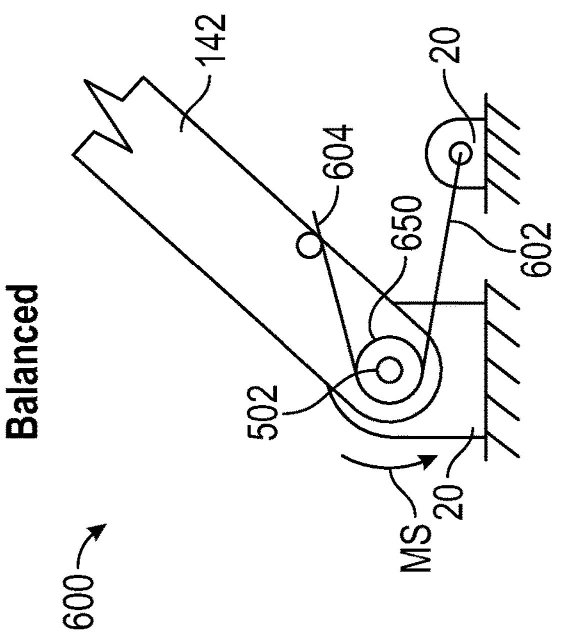
Figure 28:
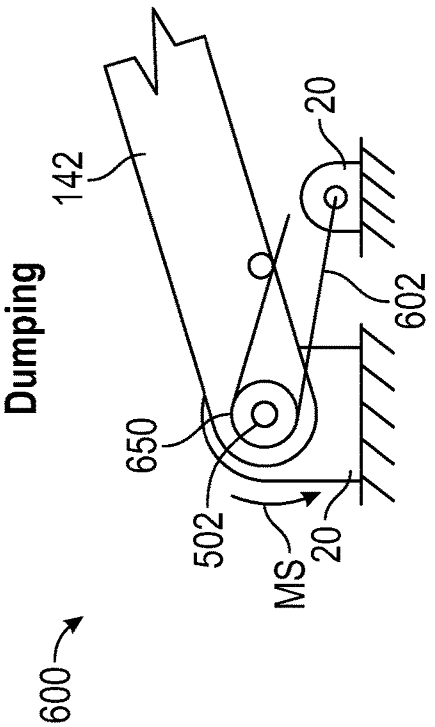
Figure 29:
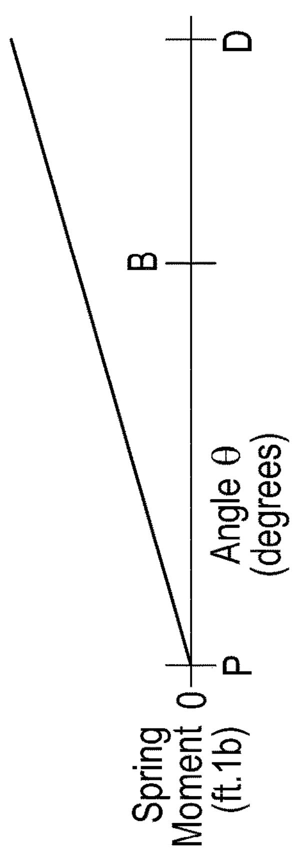
FIG. 29 is a graph illustrating a spring moment applied by the spring assist system of FIG. 26 throughout the range of motion, according to an exemplary embodiment.

FIGS. 26-29 illustrate the operation of the spring assist system 600 according to another exemplary embodiment. FIGS. 26-28 illustrate the spring assist system 600 in the pickup, balance, and dumping positions, respectively. FIG. 29 is a graph illustrating the change in spring moment MS with respect to the angle Θ. FIG. 29 illustrates the spring moment at the pickup position (P), the balanced position (B), and the dumping position (D). The angle Θ may be equal to zero degrees at the balanced position.

In the embodiment of FIGS. 26-29, the spring assist system 600 includes a torsion spring 650. The torsion spring 650 may be substantially similar to the torsion spring 610, except as otherwise specified. As shown in FIG. 29, the spring moment MS of the torsion spring 650 is positive throughout the range of motion of the lift arms 142. The minimum spring moment MS occurs at the pickup position, and the maximum spring moment MS occurs at the dumping position. The spring moment MS increases linearly as the angle Θ increases. As shown, the minimum spring moment MS is zero, such that the torsion spring 640 does not apply a moment when the lift arms 142 reach the pickup position. In other embodiments, the pretension on the torsion spring 640 is adjusted to increase the magnitude of the moment MS at the pickup position.

Referring to FIGS. 17 and 18, in step 1 of the process for emptying the refuse container 500, the torsion spring 640 provides a positive moment MS that the moment MA of the lift arm actuators 144, increasing the force that the lift arm actuators 144 are required to provide to lift the lifted mass 510. In step 2, the torsion spring 640 continues to provide the positive moment MS. The magnitude of the moment MS in step 2 may be greater than the magnitude of the moment MS in step 1. In step 3, the spring moment opposes the moment MG of the gravitational force G, decreasing the force required from the lift arm actuators 144. In step 4, the moment MS of the torsion spring 640 and the moment MG of the gravitational force drive the lift arms 142 toward the pickup position.

Bidirectional Torsion Spring

Figure 30:
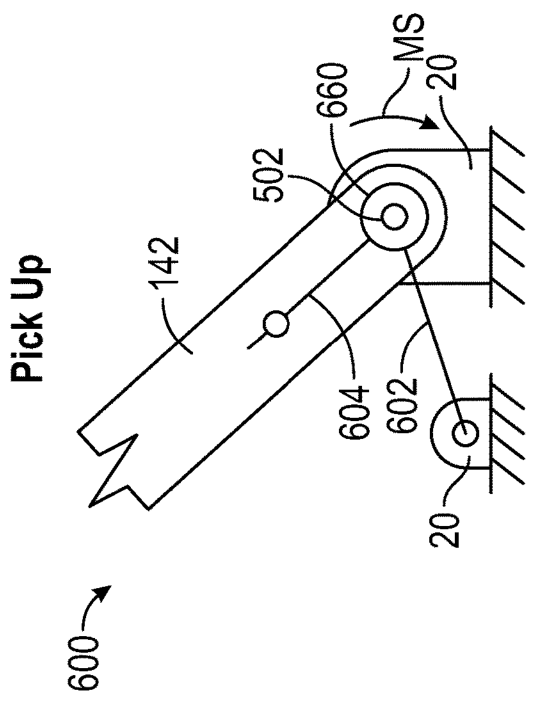
FIGS. 30-32 are side views of a spring assist system throughout the range of motion of the lift assembly of FIG. 14, according to another exemplary embodiment.
Figure 31:
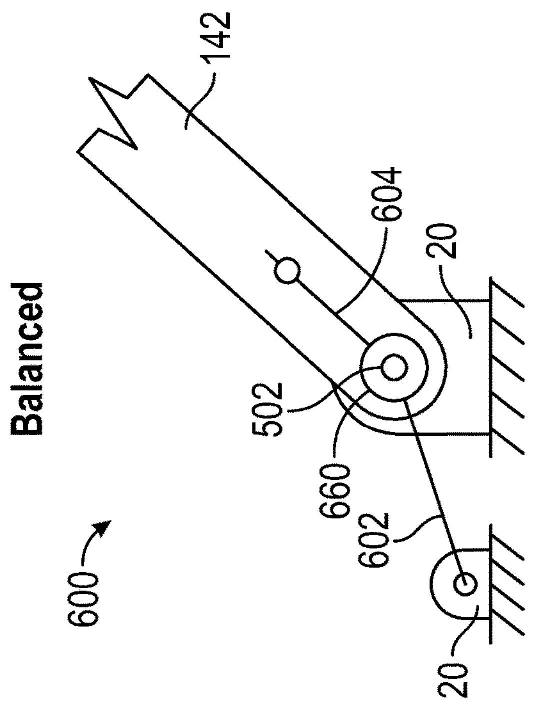
Figure 32:
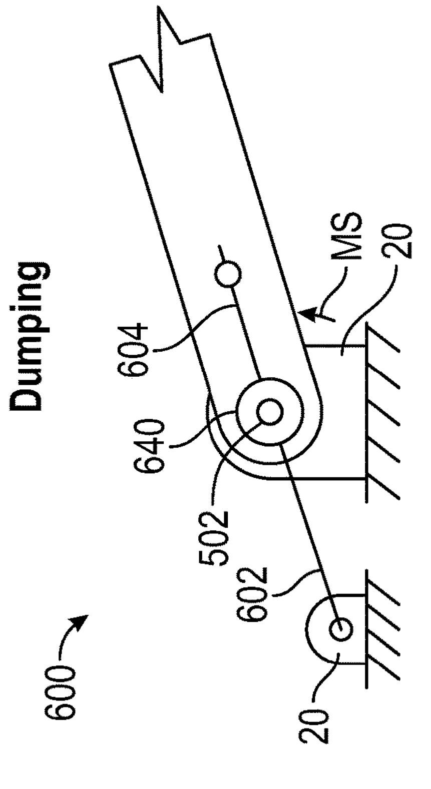
Figure 33:
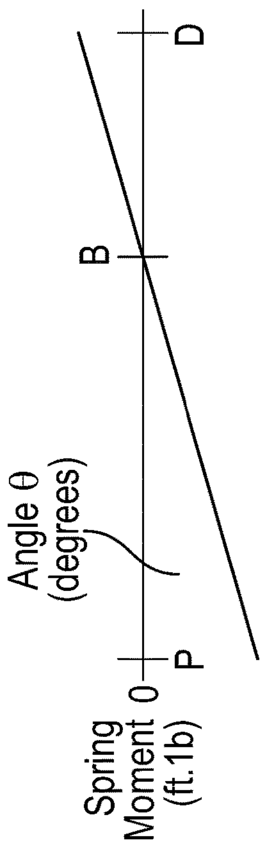
FIG. 33 is a graph illustrating a spring moment applied by the spring assist system of FIG. 30 throughout the range of motion, according to an exemplary embodiment.

FIGS. 30-33 illustrate the operation of the spring assist system 600 according to another exemplary embodiment. FIGS. 30-32 illustrate the spring assist system 600 in the pickup, balance, and dumping positions, respectively. FIG. 33 is a graph illustrating the change in spring moment MS with respect to the angle Θ. FIG. 33 illustrates the spring moment at the pickup position (P), the balanced position (B), and the dumping position (D). The angle Θ may be equal to zero degrees at the balanced position.

In the embodiment of FIGS. 30-33, the spring assist system 600 includes a torsion spring 660. The torsion spring 660 may be substantially similar to the torsion spring 610, except as otherwise specified. As shown in FIG. 33, the torsion spring 660 is a bidirectional torsion spring that changes the direction of the spring moment MS. The spring moment MS is negative between the pickup and balanced positions, decreasing in magnitude linearly as the lift arms 142 approach the balanced position. The spring moment MS is zero at the balanced position. The spring moment MS is positive between the balanced and dumping positions, increasing in magnitude linearly as the lift arms 142 approach the dumping position.

Structuring the spring assist system 600 to apply a negative moment MS in zone 1 of FIG. 17 and to apply a positive moment MS in zone 2 may act to save energy when moving through both zones. Referring to FIGS. 17 and 18, in step 1 of the process for emptying the refuse container 500, the torsion spring 660 provides a negative moment MS that counteracts the moment MG of the gravitational force G. This reduces the force that the lift arm actuators 144 are required to provide to lift the lifted mass 510, permitting the use of smaller and more cost-effective actuators. Between step 1 and step 2, the moment MS is zero. In step 2, the torsion spring 660 begins providing a positive moment MS. In step 2, the torsion spring 660 stores energy (e.g., from the gravitational force G acting on the lifted mass 510).

In step 3, the positive moment MS biases the lifted mass toward the balanced position using the energy stored during step 2. In some embodiments, the stored energy is sufficient to return the lifted mass 510 to the balanced position or beyond the balanced position without an applied force from the lift arm actuators 144, increasing the energy efficiency of the lift assembly 140. By way of example, energy is stored by the torsion spring 660 while the refuse container 500 is filled with refuse, but in step 3 the mass of the refuse is removed from the lifted mass 510. Accordingly, the energy stored during step 2 acts on a smaller mass when released in step 3 and thus may move the smaller mass a greater distance.

In step 4, the moment MS of the torsion spring 660 opposes the moment MG of the gravitational force. Depending upon the weight of the refuse container 500 without the refuse and the characteristics of the torsion spring 660, the moment MG may be sufficient to overcome the moment MS of the torsion spring 660, or the lift arm actuators 144 may supplement the moment MG. As the lift arms 142 move to the pickup position, the torsion spring 660 stores energy that can later be used to raise another refuse container 500. Accordingly, the torsion spring 660 improves the energy efficiency of the lift assembly 140 by recovering energy that would otherwise be wasted in steps 2 and 4.

Bidirectional Extension Spring

Figure 34:
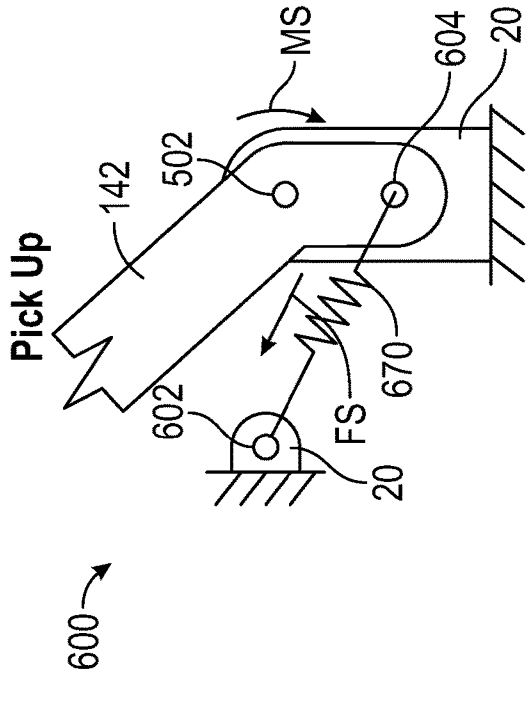
FIGS. 34-36 are side views of a spring assist system throughout the range of motion of the lift assembly of FIG. 14, according to another exemplary embodiment.
Figure 35:
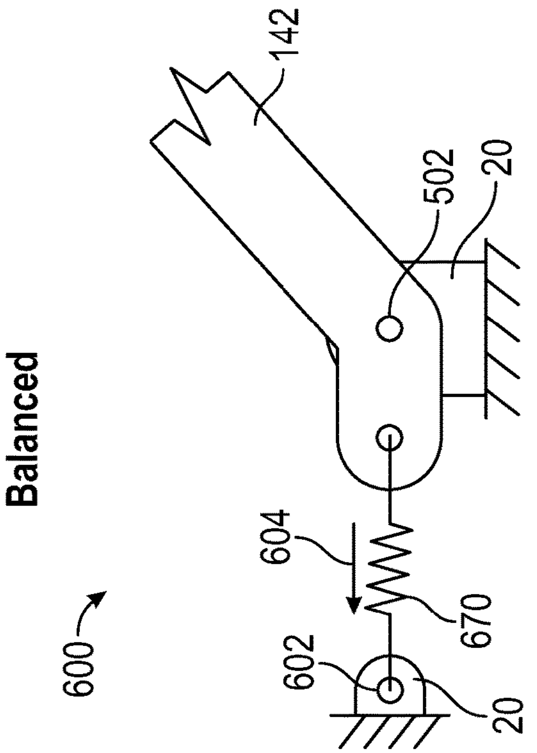
Figure 36:
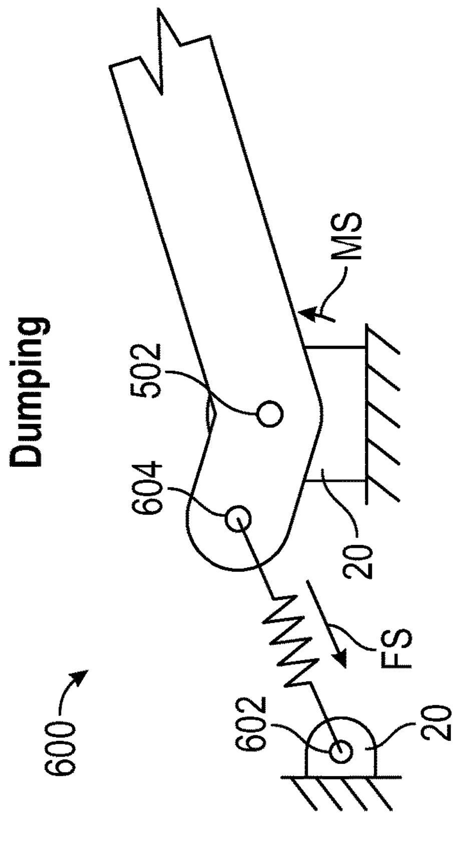
Figure 37:
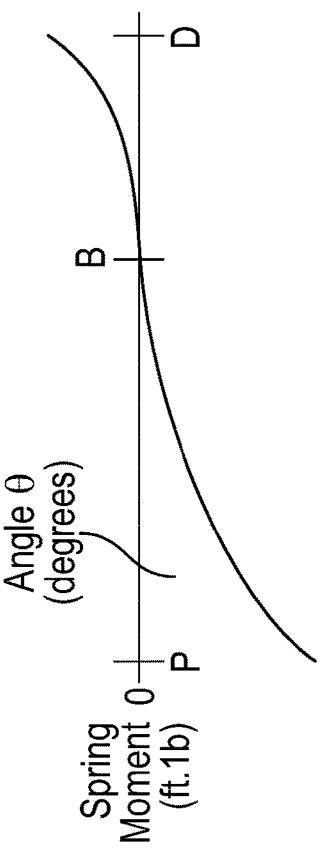
FIG. 37 is a graph illustrating a spring moment applied by the spring assist system of FIG. 34 throughout the range of motion, according to an exemplary embodiment.

FIGS. 34-37 illustrate the operation of the spring assist system 600 according to another exemplary embodiment. FIGS. 34-36 illustrate the spring assist system 600 in the pickup, balance, and dumping positions, respectively. FIG. 37 is a graph illustrating the change in spring moment MS with respect to the angle Θ. FIG. 37 illustrates the spring moment at the pickup position (P), the balanced position (B), and the dumping position (D). The angle Θ may be equal to zero degrees at the balanced position.

In the embodiment of FIGS. 34-37, the spring assist system 600 includes an extension spring 670. The extension spring 670 may be substantially similar to the extension spring 620, except as otherwise specified. As shown in FIG. 37, the extension spring 670 arranged in a bidirectional configuration that changes the direction of the spring moment MS at the balance position. In this configuration, the lift arms 142 include an extension that permits the arm portion 604 to be coupled to the lift arms 142 offset from the axis of rotation 502. The arm portion 604 is positioned to provide the change in direction of the spring moment MS at a desired position. Specifically, when the lift arms 142 are between the pickup and balanced positions, the extension spring 670 pulls upward on the lift arms 142, and the spring moment MS is negative. When the lift arms 142 are between the balanced and dumping positions, the extension spring 670 pulls downward on the lift arms 142, and the spring moment MS is positive. When the lift arms 142 are at the balanced position, the extension spring 670 is aligned with the axis of rotation 502 such that the spring moment MS is zero.

The functionality of the spring assist system 600 of FIGS. 34-37 throughout steps 1-4 may be substantially similar to the spring assist system 600 of FIGS. 30-33. Accordingly, any description with respect to the spring assist system 600 of FIGS. 30-33 may also apply to the spring assist system 600 of FIGS. 34-37, except as otherwise specified. Due to the arrangement of the extension spring 670, both (a) the distance between the anchor portion 602 and the arm portion 604 and (b) the length of the effective moment arm of the spring force FS about the axis of rotation 502 change simultaneously. Accordingly, the relationship between the moment MS of the extension spring 670 and the angle Θ may be nonlinear (e.g., quadratic, etc.).

Opposing Springs with Stops

Figure 38:
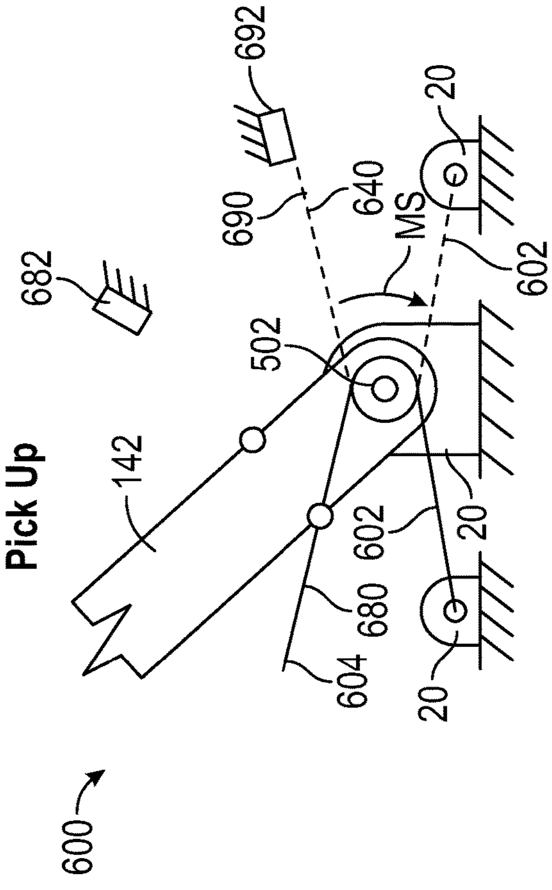
FIGS. 38-40 are side views of a spring assist system throughout the range of motion of the lift assembly of FIG. 14, according to another exemplary embodiment.
Figure 39:
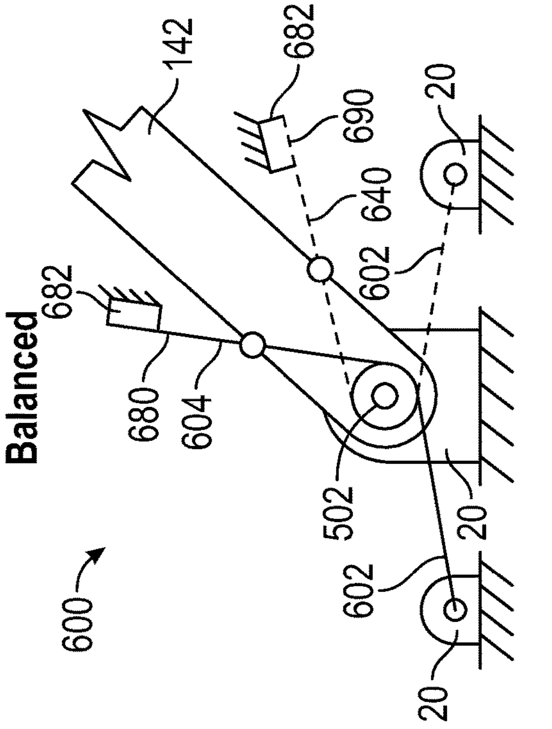
Figure 40:
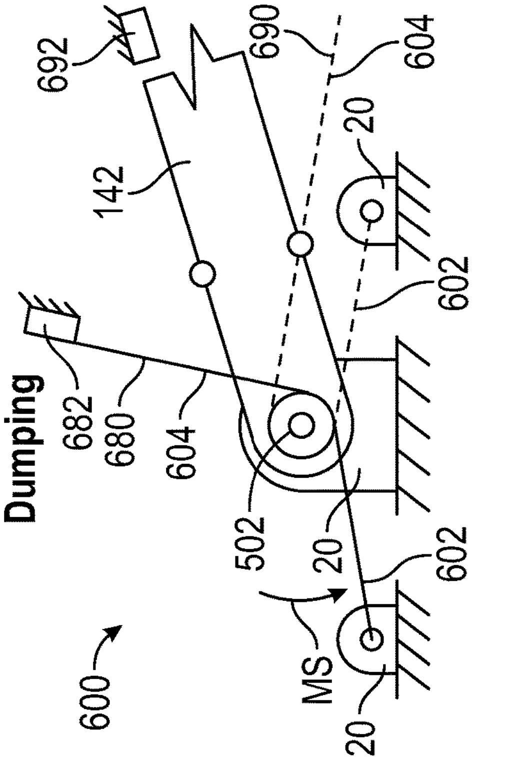

FIGS. 38-41 illustrate the operation of the spring assist system 600 according to another exemplary embodiment. FIGS. 38-40 illustrate the spring assist system 600 in the pickup, balance, and dumping positions, respectively. FIG.

Figure 41:
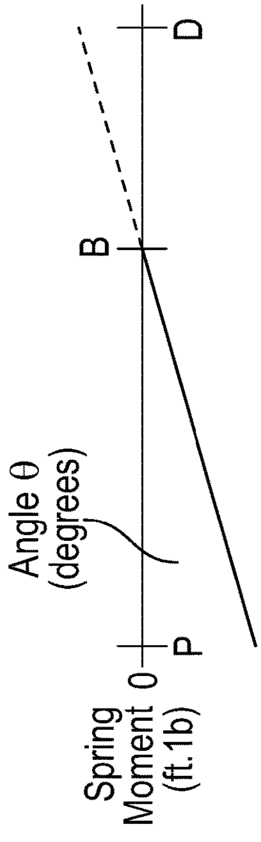
FIG. 41 is a graph illustrating a spring moment applied by the spring assist system of FIG. 38 throughout the range of motion, according to an exemplary embodiment.

41 is a graph illustrating the change in spring moment MS with respect to the angle Θ. FIG. 41 illustrates the spring moment at the pickup position (P), the balanced position (B), and the dumping position (D). The angle Θ may be equal to zero degrees at the balanced position. FIGS. 38-41 illustrate an embodiment utilizing two springs. For ease of viewing, elements relating to the first spring (e.g., the torsion spring 680) are shown in solid lines, and elements relating to the second spring (e.g., the torsion spring 690) are shown in dashed lines In the embodiment of FIGS. 38-41, the spring assist system 600 includes a torsion spring 680 and a torsion spring 690. The torsion spring 680 and the torsion spring 690 may be substantially similar to the torsion spring 610, except as otherwise specified. The torsion spring 680 is oriented to apply a negative moment on the lift arms 142. The torsion spring 690 is oriented to apply a positive moment on the lift arms 142. In the embodiment shown in FIG. 41, the torsion spring 680 and the torsion spring 690 each apply a torque that varies linearly with the angle Θ. The moment MS of the torsion spring 680 and the moment MS of the torsion spring 690 are both zero at the balanced position. In some embodiments, the characteristics (e.g., the spring rate, the pretension) of the torsion spring 680 and the torsion spring 690 are different from one another. In other embodiments, the torsion spring 680 is omitted, or the torsion spring 690 is omitted.

The spring assist system 600 further includes a pair of hard stops or limits, shown as stop 682 and stop 692. As shown, the stops 682 and 692 are coupled to the chassis 20. The stop 682 and the stop 692 limit (e.g., prevent) movement of the torsion springs 680 and 690 beyond a predetermined location, ending the application of the respective moment MS. By way of example, the stop 682 may be positioned to engage the torsion spring 680 upon the lift arms 142 reaching the balanced position, permitting the lift arms 142 to move toward the dumping position without contacting the torsion spring 680. Similarly, the stop 692 may be positioned to engage the torsion spring 690 upon the lift arms 142 reaching the balanced position, permitting the lift arms 142 to move toward the pickup position without contacting the torsion spring 690. The stop 682 and the stop 692 permit the moment MS to be applied in certain portions of the range of motion without affecting the movement of the lift arms 142 in other portions of the range of motion. The stop 682 prevents the torsion spring 680 from applying the moment MS beyond (e.g., clockwise of) the balanced position. The stop 692 prevents the torsion spring 690 from applying the moment MS beyond (e.g., counter clockwise of) the balanced position. At the balanced position, the stop 682 contacts the torsion spring 680 and the stop 692 contacts the torsion spring 690, such that the moment MS is zero.

Beneficially, the inclusion of the stop 682 and the stop 692 permits the spring assist system 600 to apply a moment MS in the desired direction when beneficial (e.g., to store energy or reduce the maximum load) and stop applying the moment MS when not beneficial (e.g., when the moment MS in a particular direction would increase the maximum load on the system). Referring to FIGS. 17 and 18, in step 1 of the process for emptying the refuse container 500, the torsion spring 680 provides a negative moment MS that counteracts the moment MG of the gravitational force G. This reduces the force that the lift arm actuators 144 are required to provide to lift the lifted mass 510, permitting the use of smaller and more cost-effective actuators. In step 1, the torsion spring 690 engages the stop 692 and contributes zero moment MS to the lift arms 142.

Between step 1 and step 2, the torsion spring 680 engages the stop 682, the torsion spring 690 engages the stop 692, and the moment MS is zero. In step 2, the torsion spring 690 begins providing a positive moment MS. The torsion spring 690 stores energy (e.g., from the gravitational force G acting on the lifted mass 510). The torsion spring 680 engages the stop 682 and contributes zero moment MS to the lift arms 142.

In step 3, the positive moment MS from the torsion spring 690 biases the lifted mass toward the balanced position using the energy stored during step 2. In some embodiments, the stored energy is sufficient to return the lifted mass 510 to the balanced position or beyond the balanced position without an applied force from the lift arm actuators 144, increasing the energy efficiency of the lift assembly 140. By way of example, energy is stored by the torsion spring 680 while the refuse container 500 is filled with refuse, but in step 3 the mass of the refuse is removed from the lifted mass 510. Accordingly, the energy stored during step 2 acts on a smaller mass when released in step 3 and thus may move the smaller mass a greater distance. In step 3, the torsion spring 680 engages the stop 682 and contributes zero moment MS to the lift arms 142.

In step 4, the torsion spring 680 applies a negative moment MS that opposes the moment MG of the gravitational force. Depending upon the weight of the refuse container 500 without the refuse and the characteristics of the torsion spring 680, the moment MG may be sufficient to overcome the moment MS of the torsion spring 680, or the lift arm actuators 144 may supplement the moment MG. As the lift arms 142 move to the pickup position, the torsion spring 680 stores energy that can later be used to raise another refuse container 500. Accordingly, the torsion spring 680 improves the energy efficiency of the lift assembly 140 by recovering energy that would otherwise be wasted in steps 2 and 4. In step 4, the torsion spring 690 engages the stop 692 and contributes zero moment MS to the lift arms 142.

Opposing Springs with Stops and Pretension

Figure 42:
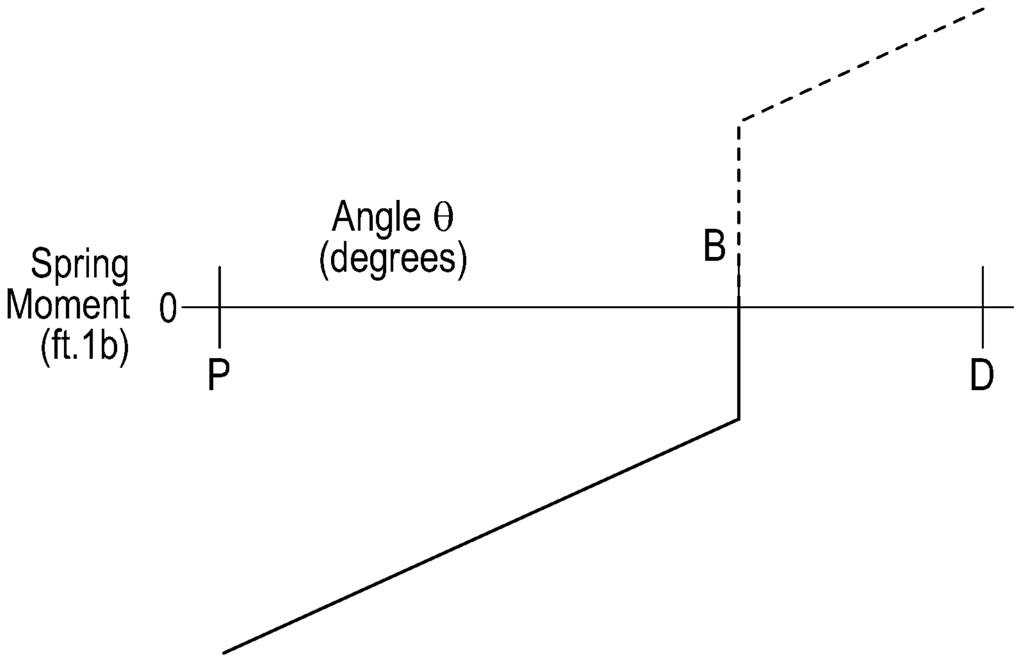
FIG. 42 is a graph illustrating a spring moment applied by the spring assist system of FIG. 38 throughout the range of motion, according to another exemplary embodiment.

FIG. 42 illustrates an alternative configuration of the spring assist system 600 of FIGS. 38-41. The spring assist system of FIG. 42 may be substantially similar to the spring assist system 600 of FIGS. 38-41 except as otherwise specified herein. In FIG. 42, the torsion spring 680 and the torsion spring 690 are each configured with a pretension, such that a threshold torque greater than zero must be applied to overcome the moment MS and begin moving the lift arms 142. Because the stops 682 and 692 stop the springs from applying a moment MS at certain positions, the torsion spring 680 and the torsion spring 690 may be held under pretension without applying a moment MS on the lift arms 142.

Electric Motor Assist

Figure 43:
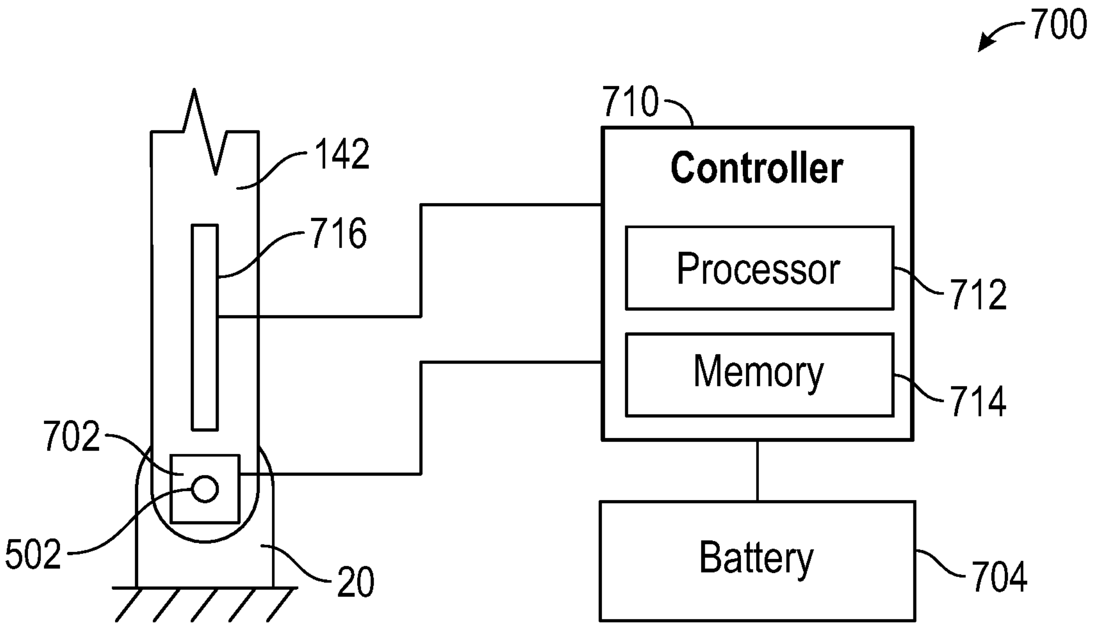
FIG. 43 is a side view of an electric assist system for use with the lift assembly of FIG. 14, according to an exemplary embodiment.

Referring to FIG. 43, in some embodiments, the refuse vehicle 100 includes an energy recovery system, electric drive system, arm return assist system, lift assister, or lift assist system, shown as electric assist system 700. The electric assist system 700 is configured to utilize an electric motor to (a) apply a braking torque and recover energy from the lift arms 142 and (b) utilize the recovered energy to assist the lift arm actuators 144. The electric assist system 700 may store energy when the lifted mass 510 is descending (e.g., moving with gravity). In this way, the electric assist system 700 may improve the energy efficiency of the lift assembly 140 (e.g., by storing energy instead of dissipating the energy as sound, vibrations, or heat). The electric assist system 700 may reduce the maximum force required by the lift arm actuators 144, facilitating the use of smaller and lower cost components.

The electric assist system 700 includes an electric actuator, electric motor, motor/generator, or electromagnetic device, shown as electric motor 702. The electric motor 702 is coupled to the chassis 20 and to the lift arms 142. The electric motor 702 may change between operating as a motor (e.g., by consuming electrical energy and supplying a drive torque to drive rotation of the lift arms 142) and operating as a generator (e.g., by applying a braking torque that opposes rotation of the lift arms 142 and generating electrical energy).

The electric assist system 700 further includes an energy storage device (e.g., batteries, capacitors, etc.), shown as battery 704. The battery 704 is configured to receive electrical energy (e.g., from the electric motor 702), store the energy (e.g., as chemical energy), and release the energy as electrical energy (e.g., to power the electric motor 702). The battery 704 may be used solely to power the electric motor 702, or also to power other functions of the refuse vehicle 100.

Operation of the electric assist system 700 is controlled by a processing circuit, shown as controller 710, that is operatively coupled to the electric motor 702 and the battery 704. The controller 710 includes a processor 712 operatively coupled to a memory device, shown as memory 714. The processor 712 may execute instructions stored on the memory 714 to perform the functions described herein.

In some embodiments, the electric assist system 700 further includes a sensor, shown as position sensor 720. The position sensor 720 is configured to provide position data that indicates a position (e.g., an angular position) of the lift arms 142. The position sensor 720 may include potentiometers, encoders, gyroscopic sensors, accelerometers, cameras, limit switches, or other sensors.

In operation, the controller 710 controls the flow of electrical energy between the electric motor 702 and the battery 704. The controller 710 may control the electric motor 702 to operate in a braking mode when the lift arms 142 are moving with gravity (e.g., in steps 2 and 4 of FIG. 18). In the braking mode, the electric motor 702 acts as a generator and applies a braking force on the lift arms 142, generating electrical energy. The generated electrical energy is stored in the battery 704. Accordingly, in the braking mode, the electric assist system 700 can slow the descent of the lift arms 142 while recapturing the potential energy of the lifted mass 510.

The controller 710 may control the electric motor 702 to operate in a driving mode when the lift arms 142 are moving against gravity (e.g., in steps 1 and 3 of FIG. 18). In the driving mode, the electric motor 702 acts as a motor, consuming electrical energy from the battery 704 and assisting the movement of the lift arms 142. Accordingly, the electric assist system 700 may utilize the recaptured energy, improving energy efficiency and reducing the force that is required to be applied by the lift arm actuators 144.

In some embodiments, the controller 710 controls the electric motor 702 based on the position data from the position sensor 720. By way of example, the position data may indicate the current angle Θ of the lift arms 142. Using the position data, the controller 710 may determine if the lift arms 142 are in zone 1 or zone 2 of FIG. 17. The controller 710 may also determine if the lift arm actuators 144 are currently extending or retracting (e.g., based on the control signals being sent to the lift arm actuators 144). Accordingly, using the current zone and whether the lift arm actuators 144 are currently extending or retracting, the controller 710 may determine if the electric motor 701 should be in the driving mode or the generating mode (e.g., using the table of FIG. 18).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:

a chassis;

a plurality of tractive elements coupled to the chassis;

a refuse compartment coupled to the chassis;

a lift arm rotatably coupled to the chassis and configured to engage a refuse container;

a lift arm actuator coupled to the chassis and configured to move the lift arm relative to the chassis to raise the refuse container and deposit refuse from the refuse container into the refuse compartment; and a lift assister coupled to the chassis and the lift arm and configured to bias the lift arm to oppose downward movement of the lift arm, wherein the lift assister is movable through a range of motion including (a) a first range of positions in which gravity biases the lift arm to move away from the refuse compartment and (b) a second range of positions in which gravity biases the lift arm to move toward the refuse compartment; and wherein either:

(a) the lift assister is configured to bias the lift arm to oppose the downward movement of the lift arm in the first range of positions and the lift assister does not oppose the downward movement of the lift arm in the second range of positions; or (b) the lift assister is configured to bias the lift arm to oppose the downward movement of the lift arm in the second range of positions and the lift assister does not oppose the downward movement of the lift arm in the first range of positions.

2. The refuse vehicle of claim 1, wherein the lift assister is configured to bias the lift arm to oppose the downward movement of the lift arm in the first range of positions and the lift assister does not oppose the downward movement of the lift arm in the second range of positions.

3. The refuse vehicle of claim 1, wherein the lift assister is configured to bias the lift arm to oppose the downward movement of the lift arm in the second range of positions and the lift assister does not oppose the downward movement of the lift arm in the first range of positions.

4. A refuse vehicle comprising:

a chassis;

a plurality of tractive elements coupled to the chassis;

a refuse compartment coupled to the chassis;

a lift arm rotatably coupled to the chassis and configured to engage a refuse container;

a lift arm actuator coupled to the chassis and configured to move the lift arm relative to the chassis to raise the refuse container and deposit refuse from the refuse container into the refuse compartment; and a lift assister coupled to the chassis and the lift arm and configured to bias the lift arm to oppose downward movement of the lift arm, the lift assister including a spring coupled to the chassis and the lift arm and configured to bias the lift arm to oppose the downward movement of the lift arm.

5. The refuse vehicle of claim 4, wherein the lift arm is movable between (a) a pickup position in which gravity biases the lift arm to rotate in a first direction and (b) a dumping position in which gravity biases the lift arm to rotate in a second direction, and wherein the spring is configured to bias the lift arm toward the dumping position when the lift arm is in the pickup position.

6. The refuse vehicle of claim 4, wherein the lift arm is movable between (a) a pickup position in which gravity biases the lift arm to rotate in a first direction and (b) a dumping position in which gravity biases the lift arm to rotate in a second direction, and wherein the spring is configured to bias the lift arm toward the pickup position when the lift arm is in the dumping position.

7. The refuse vehicle of claim 4, wherein the spring is a first spring configured to bias the lift arm in to rotate in a first direction, wherein the lift assister further includes a second spring coupled to the chassis and the lift arm and configured to bias the lift arm to rotate in a second direction.

8. The refuse vehicle of claim 4, further comprising a stop coupled to the chassis, wherein the lift arm is movable through a first range of positions and a second range of positions, wherein the spring is configured to apply a biasing force on the lift arm when the lift arm is in the first range of positions, and wherein the stop is positioned to prevent the spring from applying the biasing force on the lift arm when the lift arm is in the second range of positions.

9. The refuse vehicle of claim 4, wherein the spring is at least one of a coil spring or a gas spring.

10. The refuse vehicle of claim 4, wherein the lift assister is movable through a range of motion including (a) a first range of positions in which the lift assister applies a first biasing force on the lift arm in a first direction and (b) a second range of positions in which the lift assister applies a second biasing force on the lift arm in a second direction opposite the first direction.

11. A refuse vehicle comprising:
- a chassis;
- a plurality of tractive elements coupled to the chassis;
- a refuse compartment coupled to the chassis;
- a lift arm rotatably coupled to the chassis and configured to engage a refuse container;
- a lift arm actuator coupled to the chassis and configured to move the lift arm relative to the chassis to raise the refuse container and deposit refuse from the refuse container into the refuse compartment; and
- a lift assister coupled to the chassis and the lift arm and configured to bias the lift arm to oppose downward movement of the lift arm, wherein the lift assister includes:
  - an electric motor coupled to the chassis and the lift arm and configured to a braking torque to bias the lift arm to oppose the downward movement of the lift arm;
  - a sensor configured to provide sensor data indicating an angular position of the lift arm; and
  - a controller operatively coupled to the electric motor and configured to control the electric motor based on the sensor data.

12. The refuse vehicle of claim 11, wherein the lift assister further includes an energy storage device electrically coupled to the electric motor; and wherein the controller is configured to:
- control the electric motor to provide electrical energy to the energy storage device while the lift arm is moving downward; and
- control the electric motor to consume the electrical energy from the energy storage device and bias the lift arm upward when the lift arm is moving upward.

13. The refuse vehicle of claim 11, wherein the lift assister further includes a spring coupled to the chassis and the lift arm and configured to bias the lift arm to oppose the downward movement of the lift arm.

14. A front-loading refuse vehicle comprising:
- a chassis;
- a plurality of tractive elements coupled to the chassis;
- a refuse compartment coupled to the chassis;
- a lift arm coupled to the chassis and configured to engage a refuse container, the lift arm being rotatable relative to the chassis about an axis of rotation that extends laterally;
- a lift arm actuator coupled to the chassis and configured to move the lift arm between a forward position in which the lift arm extends forward of the axis of rotation and a rearward position in which the lift arm extends rearward of the axis of rotation; and
- a spring coupled to the chassis and the lift arm, wherein at least one of (a) the spring is configured to bias the lift arm toward the rearward position when the lift arm is in the forward position or (b) the spring is configured to bias the lift arm toward the forward position when the lift arm is in the rearward position.

15. The front-loading refuse vehicle of claim 14, wherein the spring is a first spring that is configured to bias the lift arm toward the rearward position when the lift arm is in the forward position, further comprising a second spring coupled to the chassis and the lift arm, wherein the second spring is configured to bias the lift arm toward the forward position when the lift arm is in the rearward position.

16. A front-loading refuse vehicle comprising:
- a chassis;
- a plurality of tractive elements coupled to the chassis;
- a refuse compartment coupled to the chassis;
- a lift arm coupled to the chassis and configured to engage a refuse container, the lift arm being rotatable relative to the chassis about an axis of rotation that extends laterally;
- a linear actuator having a first end coupled to the chassis and a second end coupled to the lift arm, wherein the linear actuator is configured to move the lift arm between a forward position in which the lift arm extends forward of the axis of rotation and a rearward position in which the lift arm extends rearward of the axis of rotation;
- an electric motor coupled to the lift arm and the chassis;
- a sensor configured to provide sensor data indicating an angular position of the lift arm; and
- a controller operatively coupled to the electric motor and the sensor and configured to:
  - determine, based on the sensor data, whether the lift arm is moving downward; and
  - control the electric motor to apply a braking torque on the lift arm to oppose movement of the lift arm in response to a determination that the lift arm is moving downward.

* * * * *